(12) United States Patent
Sharpe, Jr.

(10) Patent No.: US 7,660,701 B2
(45) Date of Patent: Feb. 9, 2010

(54) SYSTEM AND METHOD FOR DETECTING AN ABNORMAL SITUATION ASSOCIATED WITH A PROCESS GAIN OF A CONTROL LOOP

(75) Inventor: Joseph H. Sharpe, Jr., Houston, TX (US)

(73) Assignee: Fisher-Rosemount Systems, Inc., Austin TX ( * ) Notice: Subject to any disclaimer, the term of this patent is extended or adjusted under 35 U.S.C. 154(b) by 20 days.

(21) Appl. No.: 11/149,001

(22) Filed: Jun. 9, 2005

(65) Prior Publication Data

US 2006/0020423 A1   Jan. 26, 2006

Related U.S. Application Data

(60) Provisional application No. 60/578,957, filed on Jun. 12, 2004.

(51) Int. Cl.
*G06F 11/30* (2006.01)
*G21C 17/00* (2006.01)

(52) U.S. Cl. ...................... 702/183; 702/182
(58) Field of Classification Search .............. 702/183
See application file for complete search history.

(56) References Cited

U.S. PATENT DOCUMENTS

| | | |
|---|---|---|
| 4,527,271 A | 7/1985 | Hallee et al. |
| 4,607,325 A | 8/1986 | Horn |
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |

(Continued)

FOREIGN PATENT DOCUMENTS

EP   0 612 039 A3   8/1994

(Continued)

OTHER PUBLICATIONS

Wemwe Kalkhoff, "Agent-Oriented Robot Task Transformation", Proceedings of the International Symposium on Intelligent Control, IEEE, pp. 242-247 (Aug. 27, 1995).

(Continued)

*Primary Examiner*—Eliseo Ramos Feliciano
*Assistant Examiner*—Janet L Suglo
(74) *Attorney, Agent, or Firm*—Marshall, Gerstein & Borun

(57) ABSTRACT

In a method for monitoring a control loop in a process plant, process gain data associated with a control loop may be collected. The collected process gain data may be used to determine an expected process gain behavior. For example, expected values of a process variable for given values of a load variable may be determined. As another example, expected changes in a process variable for given changes in a load variable may be determined. Then, during operation of the control loop, the process gain may be monitored. If the monitored process gain substantially deviates from the expected behavior, this may indicate an abnormal situation associated with the control loop.

31 Claims, 18 Drawing Sheets

U.S. PATENT DOCUMENTS

| | | |
|---|---|---|
| 4,941,113 A * | 7/1990 | Dundics et al. ............... 702/83 |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,068,833 A * | 11/1991 | Lipschutz ................... 367/98 |
| 5,070,458 A | 12/1991 | Gilmore et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,311,562 A | 5/1994 | Palosamy et al. |
| 5,325,522 A | 6/1994 | Vaughn |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,461,570 A | 10/1995 | Wang et al. |
| 5,486,920 A | 1/1996 | Killpatrick et al. |
| 5,486,996 A | 1/1996 | Samad et al. |
| 5,488,697 A | 1/1996 | Kaemmerer et al. |
| 5,499,188 A | 3/1996 | Kline, Jr. et al. |
| 5,500,088 A * | 3/1996 | Allison et al. ............... 162/198 |
| 5,521,842 A | 5/1996 | Yamoda |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,654,841 A | 8/1997 | Hobson et al. |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,757,748 A | 5/1998 | Kiyoura et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 6,008,985 A | 12/1999 | Lake et al. |
| 6,017,143 A | 1/2000 | Eryurek et al. |
| 6,026,352 A | 2/2000 | Burns et al. |
| 6,033,257 A | 3/2000 | Lake et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasauskas |
| 6,119,047 A | 9/2000 | Eryurek et al. |
| 6,122,555 A | 9/2000 | Lu |
| 6,128,279 A | 10/2000 | O'Neil et al. |
| 6,134,032 A | 10/2000 | Kram et al. |
| 6,144,952 A | 11/2000 | Keeler et al. |
| 6,169,980 B1 | 1/2001 | Keeler et al. |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,701 B1 | 11/2001 | Pyötsia et al. |
| 6,332,110 B1 | 12/2001 | Wolfe |
| 6,397,114 B1 | 5/2002 | Eryurek et al. |
| 6,421,571 B1 | 7/2002 | Spriggs et al. |
| 6,445,963 B1 | 9/2002 | Blevins et al. |
| 6,532,392 B1 | 3/2003 | Eryurek et al. |
| 6,539,267 B1 | 3/2003 | Eryurek et al. |
| 6,564,158 B1 * | 5/2003 | Rabel et al. ................... 702/57 |
| 6,615,090 B1 | 9/2003 | Blevins et al. |

| | | | |
|---|---|---|---|
| 6,633,782 | B1 | 10/2003 | Schleiss et al. |
| 7,029,596 | B2 * | 4/2006 | Hsieh et al. .................. 216/89 |
| 2002/0022894 | A1 | 2/2002 | Eryurek et al. |
| 2002/0038156 | A1 | 3/2002 | Eryurek et al. |
| 2002/0077711 | A1 | 6/2002 | Nixon et al. |
| 2002/0147511 | A1 | 10/2002 | Eryurek et al. |
| 2002/0161940 | A1 | 10/2002 | Eryurek et al. |
| 2002/0163427 | A1 | 11/2002 | Eryurek et al. |
| 2003/0014500 | A1 | 1/2003 | Schleiss et al. |
| 2004/0052526 | A1 | 3/2004 | Jones et al. |

FOREIGN PATENT DOCUMENTS

| | | |
|---|---|---|
| EP | 0 626 697 A1 | 11/1994 |
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |

OTHER PUBLICATIONS

"GE Predictor™ Services: GE Predictor Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustial.com/cwc/services?id=75 on Jul. 18, 2002.

Ashish Mehta, et al., "Feedforward Neural Networks for Process Identification and Prediction," presented at ISA 2001, Houston, Texas, Sep. 2001.

Vasiliki Tzovla, et al., "Abnormal Condition Management Using Expert Systems," presented at ISA 2001, Houston, Texas, Sep. 2001.

International Search Report issued in PCT/US2005/020388 mailed on Oct. 19, 2005.

Written Opinion issued in PCT/US2005/020388 mailed on Oct. 19, 2005.

International Preliminary Report on Patentability issued in PCT/US2005/020388 dated Dec. 14, 2006.

Office Action for Chinese Patent Application No. 200580019273.X, dated Mar. 13, 2009.

* cited by examiner

SYSTEM AND METHOD FOR DETECTING AN ABNORMAL SITUATION ASSOCIATED WITH A PROCESS GAIN OF A CONTROL LOOP

CROSS-REFERENCES TO RELATED APPLICATIONS

This application claims the benefit of U.S. Provisional Patent Application No. 60/578,957, filed Jun. 12, 2004, which is hereby incorporated by reference herein in its entirety for all purposes.

BACKGROUND

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as OPC connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the Asset Management Solutions (AMS™) application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS™ application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

One technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, entitled "Root Cause Diagnostics" (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may then sent to a user and analyzed to recognize patterns suggesting the future occurrence of a known abnormal situation. Once a particular suspected future abnormal situation is detected, steps may be taken to correct the underlying problem, thereby avoiding the abnormal situation in the first place.

Other techniques have been developed to monitor and detect problems in a process plant. One such technique is referred to as Statistical Process Control (SPC). SPC has been used to monitor variables, such as quality variables, associated with a process and flag an operator when the quality variable is detected to have moved from its "statistical" norm. With SPC, a small sample of a variable, such as a key quality variable, is used to generate statistical data for the small sample. The statistical data for the small sample is then compared to statistical data corresponding to a much larger sample of the variable. The variable may be generated by a laboratory or analyzer, or retrieved from a data historian. SPC alarms are generated when the small sample's average or standard deviation deviates from the large sample's average or standard deviation, respectively, by some predetermined amount. An intent of SPC is to avoid making process adjustments based on normal statistical variation of the small samples. Charts of the average or standard deviation of the small samples may be displayed to the operator on a console separate from a control console.

Another technique analyzes multiple variables and is referred to as multivariable statistical process control (MSPC). This technique uses algorithms such as principal component analysis (PCA) and projections to latent structures (PLS) which analyze historical data to create a statistical model of the process. In particular, samples of variables corresponding to normal operation and samples of variables corresponding to abnormal operation are analyzed to generate a model to determine when an alarm should be generated. Once the model has been defined, variables corresponding to a current process may be provided to the model, which may generate an alarm if the variables indicate an abnormal operation.

With model-based performance monitoring system techniques, a model is utilized, such as a correlation-based model or a first-principle model, that relates process inputs to process outputs. The model may be calibrated to the actual plant operation by adjusting internal tuning constants or bias terms. The model can be used to predict when the process is moving into an abnormal region and alert the operator to take action. An alarm may be generated when there is a significant deviation in actual versus predicted behavior or when there is a big change in a calculated efficiency parameter. Model-based performance monitoring systems typically cover as small as a single unit operation (e.g. a pump, a compressor, a heater, a column, etc.) or a combination of operations that make up a process unit (e.g. crude unit, fluid catalytic cracking unit (FCCU), reformer, etc.)

Proportional-Integral-Derivative (PID) loop monitoring systems (e.g. DeltaV Inspect from Emerson Process Management, Loop Doctor from Matrikon, and Loop Scout from Honeywell) generate statistical data associated with a control loop. With PID loop monitoring systems, the generated statistical data is used to detect problems with the control loop such as high variability, limited control action, incorrect controller mode, and bad inputs. Also, PID loop tuning systems calculate process and controller gains, time constants and tuning factors and can be used to detect and correct problems with the control loop.

Further, techniques have been developed for analyzing the performance and detecting problems with various field devices. In one technique, for example, a "signature" of a valve is captured when the valve is first commissioned. For instance, the system may stroke the valve from 0 to 100% and record the amount of air pressure required to move the valve through its full cycle. This "signature" is then used to monitor the actual air pressure against the signature air pressure and alert a maintenance technician when the deviation is too great.

SUMMARY

Systems and methods for monitoring control loops in a process plant are disclosed. Process gain data associated with a control loop may be collected. The collected process gain data may be used to determine an expected process gain behavior. For example, expected values of a process variable for given values of a load variable may be determined. As another example, expected changes in a process variable for given changes in a load variable may be determined. Then, during operation of the control loop, the process gain may be monitored. If the monitored process gain substantially deviates from the expected behavior, this may indicate an abnormal situation associated with the control loop. It may be determined if the monitored process gain substantially deviates from the expected behavior by determining if a process variable falls outside of a confidence interval, for example. As another example, it may be determined if the monitored process gain substantially deviates from the expected behavior by determining if a calculated process gain falls outside of a confidence interval.

In some implementations, it may be helpful to provide a common set of criteria for a plurality of similar unit operations (e.g., a plurality of heaters, a plurality of distillation columns, a plurality of compressors, etc.) in the process plant, the criteria for determining if an abnormal situation exists based on process gain behavior. For each particular unit operation, however, expected process gain behavior could be determined individually. Then, process gains for the unit operations could be monitored based on the expected process gain behaviors, and abnormal situations could be detected based on the common set of criteria.

DETAILED DESCRIPTION

Figure 1:
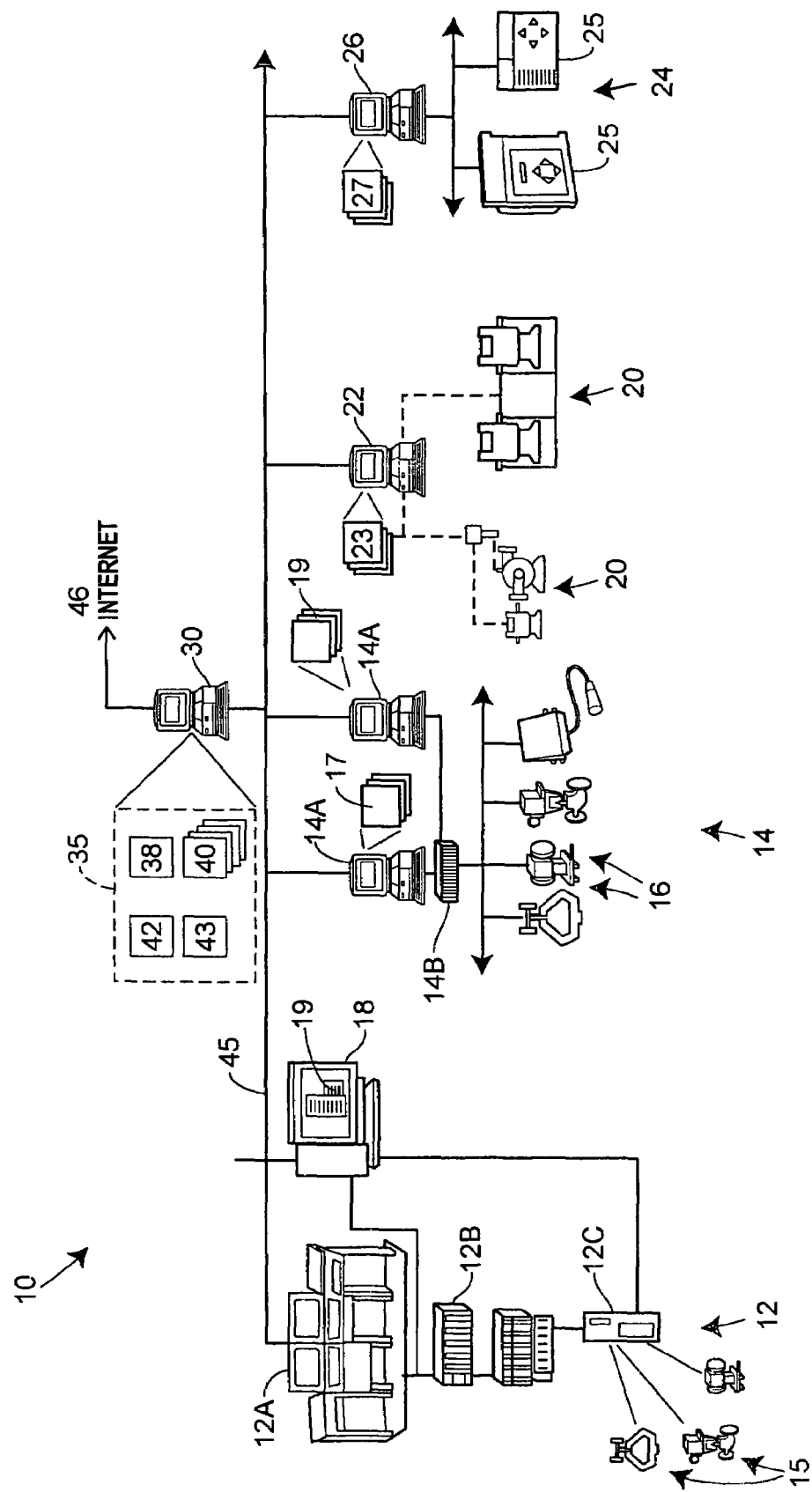
FIG. 1 is a block diagram of an example process plant having a distributed control and maintenance network including one or more operator and maintenance workstations, controllers, field devices and supporting equipment.

Referring now to FIG. 1, an example process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS™ application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSI (an Emerson Process Management Company) or any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire of measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration and data collection application 38, a viewing or interface application 40, which may include statistical collection and processing blocks, and a rules engine development and execution application 42 and, additionally, stores a statistical process monitoring database 43 that stores statistical data generated within certain devices within the process. Generally speaking, the configuration and data collection application 38 configures and communicates with each of a number of statistical data collection and analysis blocks (not shown in FIG. 1) located in the field devices 15, 16, the controllers 12B, 14B, the rotating equipment 20 or its supporting computer 22, the power generation equipment 25 or its supporting computer 26 and any other desired devices and equipment within the process plant 10, to thereby collect statistical data (or in some cases, process variable data) from each of these blocks with which to perform abnormal situation prevention. The configuration and data collection application 38 may be communicatively connected via a hardwired bus 45 to each of the computers or devices within the plant 10 or, alternatively, may be connected via any other desired communication connection including, for example, wireless connections, dedicated connections which use OPC, intermittent connections, such as ones which rely on handheld devices to collect data, etc. Likewise, the application 38 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. The application 38 may generally store the collected data in the database 43.

Once the statistical data (or process variable data) is collected, the viewing application 40 may be used to process this data and/or to display the collected or processed statistical data (e.g., as stored in the database 43) in different manners to enable a user, such as a maintenance person, to better be able to determine the existence of or the predicted future existence of an abnormal situation and to take preemptive corrective actions. Thus, the term "abnormal situation prevention" may include detecting an abnormal situation in its early stages in order to allow corrective or mitigating actions to be taken before more serious and/or expensive actions need to be taken and/or before the abnormal situation develops into a more serious and/or expensive situation. As a simple example, early detection of a valve problem may allow inexpensive corrective action to be taken before an entire batch is ruined or before a process unit must be shut down for safety reasons. The rules engine development and execution application 42 may use one or more rules stored therein to analyze the collected data to determine the existence of, or to predict the future existence of an abnormal situation within the process plant 10. Additionally, the rules engine development and execution application 42 may enable an operator or other user to create additional rules to be implemented by a rules engine to detect or predict abnormal situations.

Figure 2:
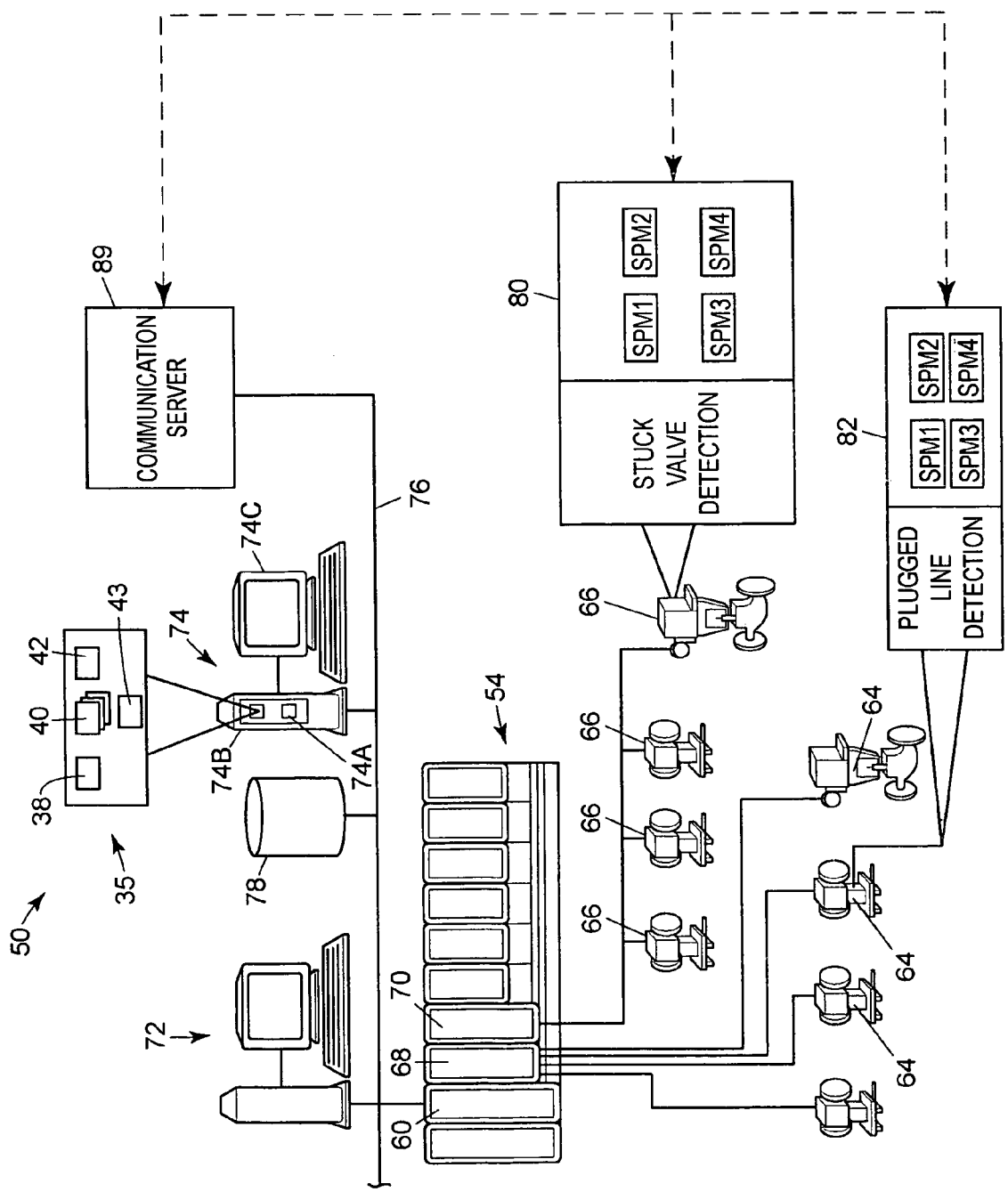
FIG. 2 is a block diagram of a portion of the process plant of FIG. 1, illustrating communication interconnections between various components of an abnormal situation prevention system located within different elements of the process plant.

FIG. 2 illustrates a portion 50 of the example process plant 10 of FIG. 1 for the purpose of describing one manner in which statistical data collection may be performed by the abnormal situation prevention system 35. While FIG. 2 illustrates communications between the abnormal situation prevention system applications 38, 40 and 42 and the database 43 and one or more data collection blocks within HART and Fieldbus field devices, it will be understood that similar communications can occur between the abnormal situation prevention system applications 38, 40 and 42 and other devices and equipment within the process plant 10, including any of the devices and equipment illustrated in FIG. 1.

The portion 50 of the process plant 10 illustrated in FIG. 2 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART field devices and the field devices 66 are illustrated as Fieldbus field devices, although these field devices could use any other desired communication protocols. Additionally, the field devices 64 and 66 may be any types of devices such as, for example, sensors, valves, transmitters, positioners, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected by the field devices 64 and 66 within the process plant 10 or statistical data determined from process variables collected by the field devices 64 and 66.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention applications 38, 40 and 42 discussed with respect to FIG. 1 in a manner that these applications can be implemented on the processor 74A to provide information to a user via the display 74C (or any other display device, such as a printer).

Additionally, as shown in FIG. 2, some (and potentially all) of the field devices 64 and 66 include data collection and processing blocks 80 and 82. While, the blocks 80 and 82 are described with respect to FIG. 2 as being advanced diagnostics blocks (ADBs), which are known Foundation Fieldbus function blocks that can be added to Fieldbus devices to collect and process statistical data within Fieldbus devices, for the purpose of this discussion, the blocks 80 and 82 could be or could include any other type of block or module located within a process device that collects device data and calculates or determines one or more statistical measures or parameters for that data, whether are not these blocks are located in Fieldbus devices or conform to the Fieldbus protocol. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70 or any of the devices illustrated in FIG. 1. Additionally, the blocks 80 and 82 could be in any subset of the devices 64 and 66.

Generally speaking, the blocks 80 and 82 or sub-elements of these blocks, collect data, such a process variable data, within the device in which they are located and perform statistical processing or analysis on the data for any number of reasons. For example, the block 80, which is illustrated as being associated with a valve, may have a stuck valve detection routine which analyzes the valve process variable data to determine if the valve is in a stuck condition. In addition, the block 80 includes a set of four statistical process monitoring (SPM) blocks or units SPM1-SPM4 which may collect process variable or other data within the valve and perform one or more statistical calculations on the collected data to determine, for example, a mean, a median, a standard deviation, etc. of the collected data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPMs are generally located in the devices where the device data is collected, the SPMs can acquire quantitatively more and qualitatively more accurate process variable data. As a result, the SPM blocks are generally capable of determining better statistical calculations with respect to the collected process variable data than a block located outside of the device in which the process variable data is collected.

As another example, the block 82 of FIG. 2, which is illustrated as being associated with a transmitter, may have a plugged line detection unit that analyzes the process variable data collected by the transmitter to determine if a line within the plant is plugged. In addition, the block 82 includes a set of four SPM blocks or units SPM1-SPM4 which may collect process variable or other data within the transmitter and perform one or more statistical calculations on the collected data to determine, for example, a mean, a median, a standard deviation, etc. of the collected data. If desired, the underlying operation of the blocks 80 and 82 may be performed or implemented as described in U.S. Pat. No. 6,017,143 referred to above. While the blocks 80 and 82 are illustrated as including four SPM blocks each, the blocks 80 and 82 could have any other number of SPM blocks therein for collecting and determining statistical data. Likewise, while the blocks 80 and 82 are illustrated as including detection software for detecting particular conditions within the plant 10, they need not have such detection software. Still further, while the SPM blocks discussed herein are illustrated as being sub-elements of ADBs, they may instead be stand-alone blocks located within a device. Also, while the SPM blocks discussed herein may be known Foundation Fieldbus SPM blocks, the term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software or firmware or other elements that perform this function, whether these elements are in the form of function blocks, or other types of blocks, programs, routines or elements and whether or not these elements conform to the Foundation Fieldbus protocol, or some other protocol, such as Profibus, HART, CAN, etc. protocol.

The term "process gain" may be used to refer to a change in a process variable (PV) resulting from some change in a load variable (LV) associated with the PV. For instance, a process gain may be a final, steady-state change in the PV resulting from a 0.1% change, a 1% change, a 5% change, a 10% change, etc., in the LV. The term "process gain" also may be used to refer to a ratio of a steady-state value of the PV at a given value of the LV. The PV could be an input to or an output from a controller (e.g., a PID controller), for example. The LV could be some other process variable associated with the PV, or it could be a control output (OP), for example. For many control loops and controllers, the actual process gain can be expected to vary over the range of the LV. For example, valve linearization techniques are often applied to approximate a linear gain from closed to fully open so that the PID algorithm (a linear controller) will work properly across the full range of a valve. Some controllers may utilize a Proportional-Integral-Derivative (PID) control algorithm to generate the OP. For example, typical continuous or batch processes in various industries are controlled using PID control algorithms to manipulate valves that control process flows of some kind. A typical PID algorithm is tuned to respond to a deviation in a PV input to the algorithm from a setpoint (SP) or target input.

Figure 3:
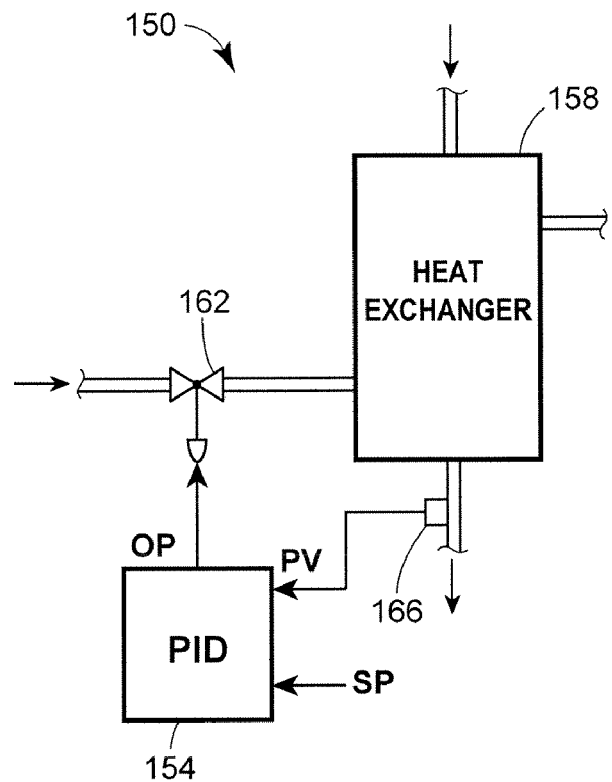
FIG. 3 is a block diagram of an example control loop for a heat exchanger.

FIG. 3 illustrates an example heat exchanger control loop 150 that employs a PID algorithm 154. The control loop 150 may be implemented in a process plant such as the process plant 10 of FIG. 1, and/or by a portion of a process plant such as the portion 50 of FIG. 2. The control loop 150 includes a heat exchanger 158 having a plurality of inputs and outputs. The control loop 150 also includes a valve field device 162 to vary an input to the heat exchanger 158 and a temperature sensor field device 166 to monitor a temperature of an output of the heat exchanger 158.

In the example control loop 150, the PID algorithm 154 adjusts an OP (which is used to control the valve 162) in response to deviations in the PV input (the output of the temperature sensor 166) from a SP input. Referring to FIG. 2, the PID algorithm may be implemented by one or more of the controller 60, a field device 64, and a field device 66, for example. Referring again to FIG. 3, the PID algorithm 154 may be implemented by one or more of a controller (not shown in FIG. 3), the valve field device 162, the temperature sensor field device 166, or some other field device not shown in FIG. 3, for example.

In the control loop 150 of FIG. 3, a process gain may be determined as a final, steady-state change in the PV input to the PID algorithm 154 resulting from some change in the control OP of the PID algorithm 154.

Figure 4:
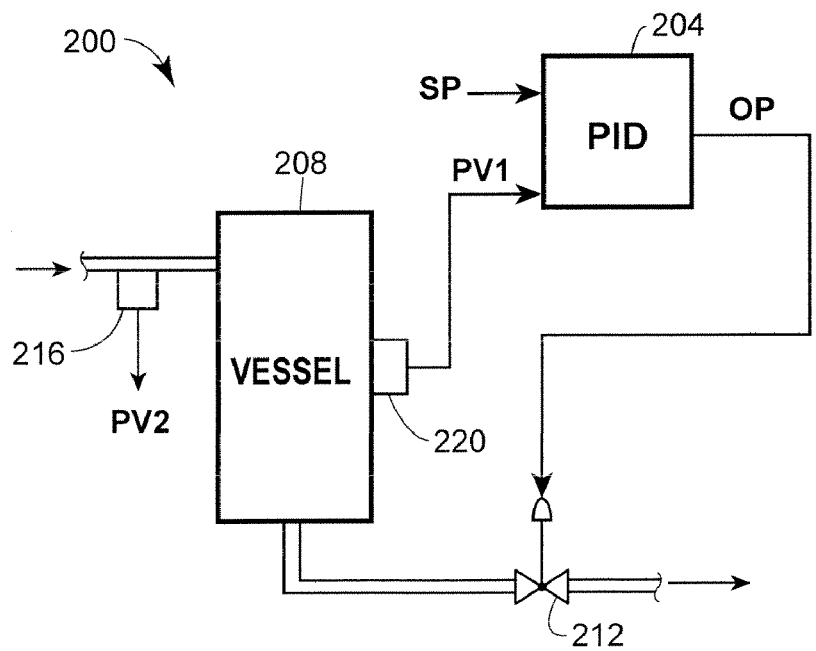
FIG. 4 is a block diagram of an example control loop for a level controller.

The process gain of a control loop need not be based on a PV input to a PID algorithm. Rather, the process gain could be based on some other PV in the control loop. FIG. 4 illustrates an example level control loop 200 that employs a PID algorithm 204. The control loop 200 may be implemented in a process plant such as the process plant 10 of FIG. 1, and/or by a portion of a process plant such as the portion 50 of FIG. 2. The control loop 200 includes a vessel 208 having a plurality of inputs and outputs. The control loop 200 also includes a valve field device 212 to vary an output of the vessel 208 and a flow rate sensor field device 216 to sense a flow rate into the vessel 208. The flow rate sensor field device 216 may generate a process variable (PV2) indicative of the flow rate into the vessel 208. The control loop 200 may further include a level sensor field device 220 to sense a level of material in the vessel 208.

In the example control loop 200, the PID algorithm 204 adjusts an OP (which is used to control the valve 212) in response to deviations in a process variable input (PV1) (which is the output of the level sensor 220) from a SP input. Referring to FIG. 2, the PID algorithm may be implemented by one or more of the controller 60, a field device 64, and a field device 66, for example. Referring again to FIG. 4, the PID algorithm 204 may be implemented by one or more of a controller (not shown in FIG. 4), the valve field device 212, the flow rate sensor field device 216, the level sensor field device 220, or some other field device not shown in FIG. 4, for example.

In the control loop 200 of FIG. 4, a process gain may be determined as a final, steady-state change in OP resulting from some change in PV2. The process variable PV2 may also be referred to as a LV. In this example, the OP is the independent process variable (PV) that is a function of the LV.

The control loops illustrated in FIGS. 3 and 4 are merely examples of control loops with which methods, systems, and techniques that will be described in more detail below can be utilized. One of ordinary skill in the art will recognize that many other types of control loops can be utilized as well.

SPM blocks can be used to generate statistical data associated with a process gain of a control loop. This statistical data may be useful in detecting, predicting, preventing, mitigating, etc., an abnormal situation associated with the control loop. The statistical data associated with the control loop that may be generated based on data generated by SPM blocks may, for example, be compared to an expected PV for a given OP or LV, an expected OP for a given PV or LV, an expected change in the PV for a given change in the OP or LV, an expected change in the OP for a given change in the PV or LV, etc. Many other types of statistical data associated with the control loop may also be generated using the SPM blocks and may be compared to many-different types of data. The statistical data generated using the SPM blocks can be used to detect, predict, prevent, mitigate, etc., an abnormal situation. For example, if an actual PV or an actual change in the PV deviates from the expected PV or the expected change in the PV, respectively, by some degree or amount, an alarm or alert may be generated, further analysis may be performed, a control parameter may be adjusted, etc.

One technique that may be used to determine data associated with the process gain of a control loop may include operating the control loop across an operating region and collecting data points associated with the process gain. With a control loop including a valve for example, PV data could be collected as an OP signal is varied to cycle a valve from a fully closed position to a fully open position (or vice versa). Then, the collected data could be used to generate expected PV values for different OP values. As just one example, any of a variety of suitable algorithms (e.g., a least squares algorithm) could be used to fit a curve to the collected data of actual PV values for different OP values. The relationship of expected PV values for given OP values (or vice versa) for a control loop may be referred to as the signature of the control loop.

Figure 5:
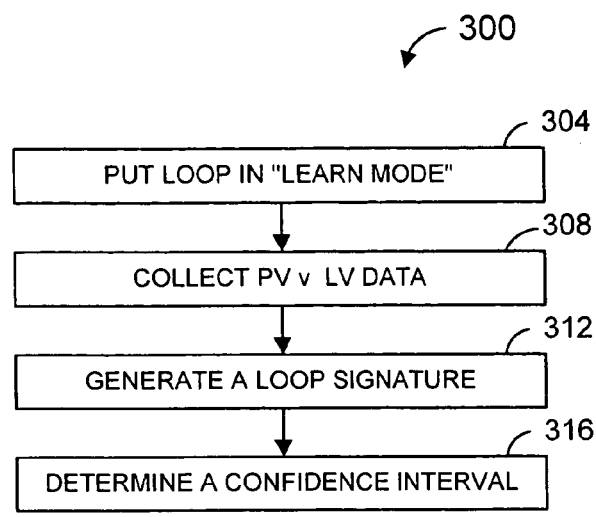
FIG. 5 is a flow diagram of an example method for generating process gain data for a control loop.
Figure 6:
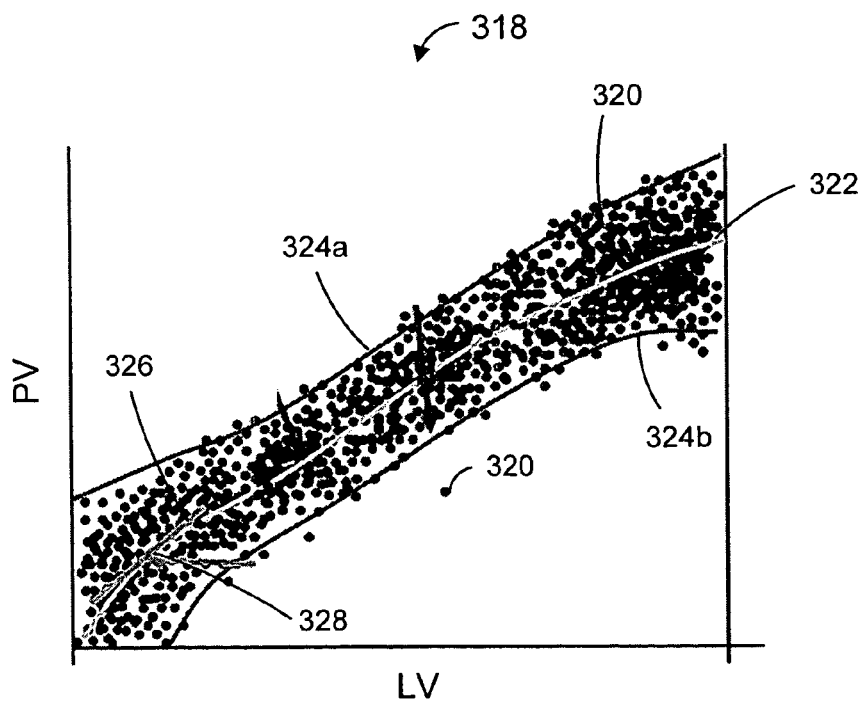
FIG. 6 is a graph of process gain data for a control loop.

FIG. 5 is a flow diagram of an example method 300 that may be used to generate process gain data for a control loop. The example method 300 will be described with reference to FIG. 6. At a block 304, the control loop may be put into a mode in which PV vs. LV data may be collected over different segments of operation of the control loop and for some period of time. This mode of operation may be referred to as a "Learn Mode" and may be performed, for example, at startup or some other suitable time. At a bloc 308, PV vs. LV data may be collected during the Learn Mode. FIG. 6 illustrates an example graph 318 in which collected PV vs. LV data for a control loop, such as the control loop of FIG. 3, collected during a Learn Mode, is shown. Each dot 320 may represent a collected PV, LV data pair.

Referring again to FIG. 5, at a block 312, a signature of the loop may be generated based on the data collected at the block 308. As just one example, a curve may be fitted to the collected data in an operating region of the loop using any of various suitable algorithms. The fitted curve may comprise the signature of the loop in the operating region. In the example graph 318, a curve 322 has been fit to the collected data using a least squares algorithm. One of ordinary skill in the art will recognize that other curve fitting techniques may be used as well.

At a block 316, confidence intervals may be generated for the Signature. The generated confidence intervals may be indicative of a 95% confidence level, for example. Other confidence levels may be employed as well such as 90%, 99%, 99.9%, etc. Any of various suitable algorithms may be used to generate the confidence intervals using the data collected at the block 308. In the example graph 318, lines 324a and 324b indicate a confidence interval corresponding to the signature 322. The lines 324a and 324b may indicate a 95% confidence level, as an example.

The line 326 indicates a slope of the signature 322 at the point 328. This slope may indicate the process gain of the control loop corresponding to the PV and LV at the point 328. In some implementations, the line 322 may indicate the process gain of the control loop. Namely, the line 322 indicates for each value of LV an expected value of PV.

In other implementations, intervals different than confidence intervals may be used. As just one example, an operator could select an interval to be used based, for instance, on the operator's knowledge of the operation of the control loop.

Figure 7:
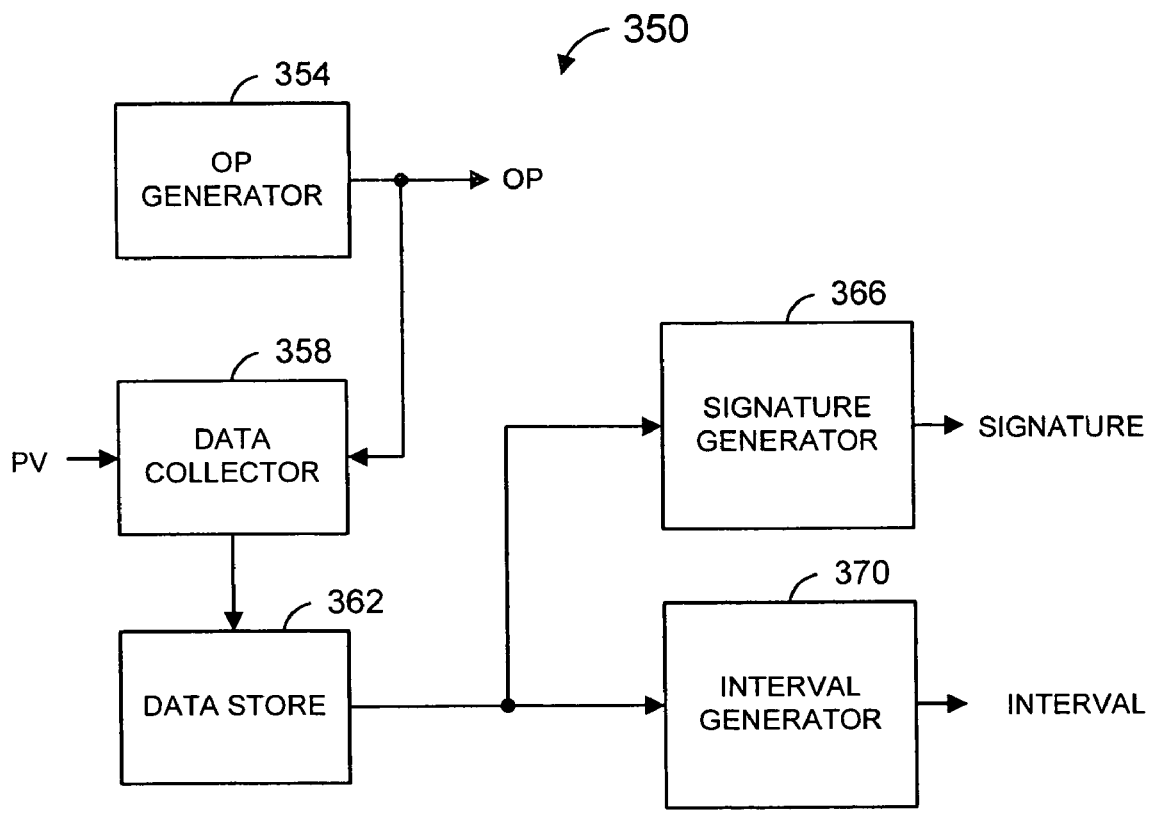
FIG. 7 is a block diagram of an example subsystem that may be used to generate process gain data for a control loop.

FIG. 7 is a block diagram of an example subsystem 350 that may be used to generate a signature and confidence interval for a control loop such as the control loop of FIG. 3. The subsystem 350 may be implemented in whole or in part, for example, by one or more data collection and processing blocks similar to the blocks 80 and 82 of FIG. 2. Further, the subsystem 350 may be implemented in whole or in part by one or more of field devices associated with the control loop, a controller associated with the control loop, field devices and/or controllers not associated with the control loop, a workstation, etc.

The subsystem 350 may comprise an OP generator 354 to cause the OP to vary during the Learn mode. The OP generator 354 may be implemented using the PID 154 (FIG. 3), for instance. As just one example, the SP input to the PID 154 could be varied to cause the OP to vary. Thus, the OP generator 354 may comprise a SP generator and a PID, for example.

The subsystem 350 may also comprise a data collector 358 to collect PV and OP data during the Learn mode. A data store 362 may store the data collected by the data collector 358. Optionally, the data may be processed by the data collector 358 prior to storing in the data store 362. For example, the data could be filtered, averaged, etc.

A signature generator 366 may use the data from the data store to generate a signature for the control loop. Similarly, an interval generator 370 may use the data from the data store to generate an interval for the signature such as a confidence interval. The signature generator 366 and the interval generator 370 may optionally use other data as well. The signature generator 366 and the interval generator 370 may be implemented as separate components or as a single component, for example.

Figure 8:
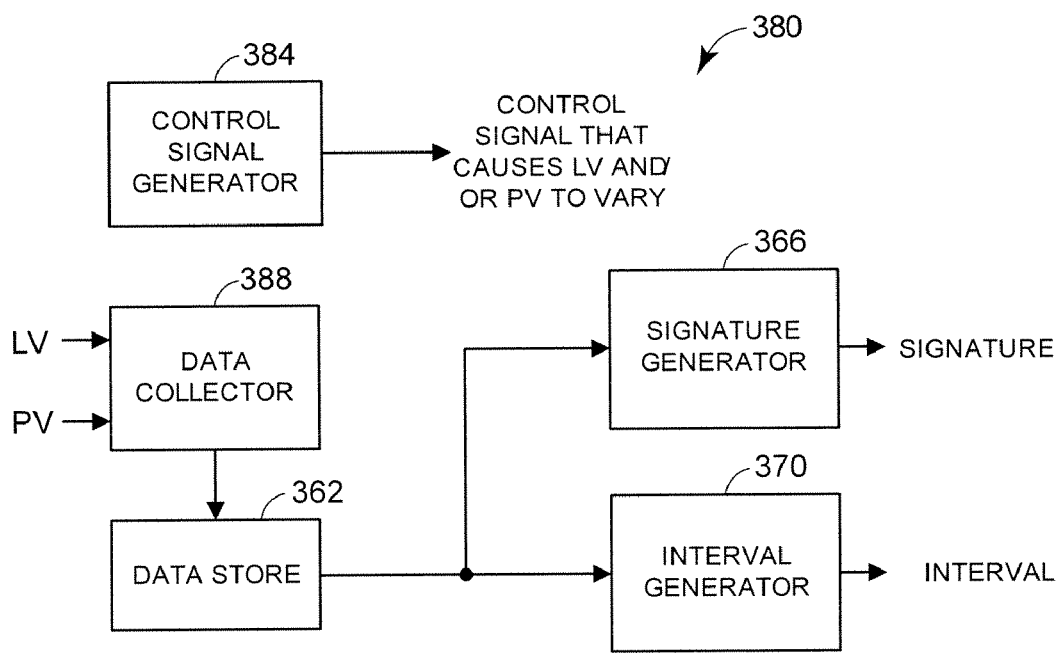
FIG. 8 is a block diagram of another example subsystem that may be used to generate process gain data for a control loop.

FIG. 8 is a block diagram of an example subsystem 380 that may be used to generate a signature and a confidence interval for a control loop such as the control loop of FIG. 4. The subsystem 380 is similar to the subsystem 350 of FIG. 7 and may include some of the same elements.

The subsystem 380 may comprise a control signal generator 354 that causes the PV and/or the LV to vary during the Learn mode. The control signal generator 354 could comprise a SP generator and a PID, for example. The subsystem 380 may also comprise a data collector 388 to collect PV and LV data during the Learn mode.

Figure 9:
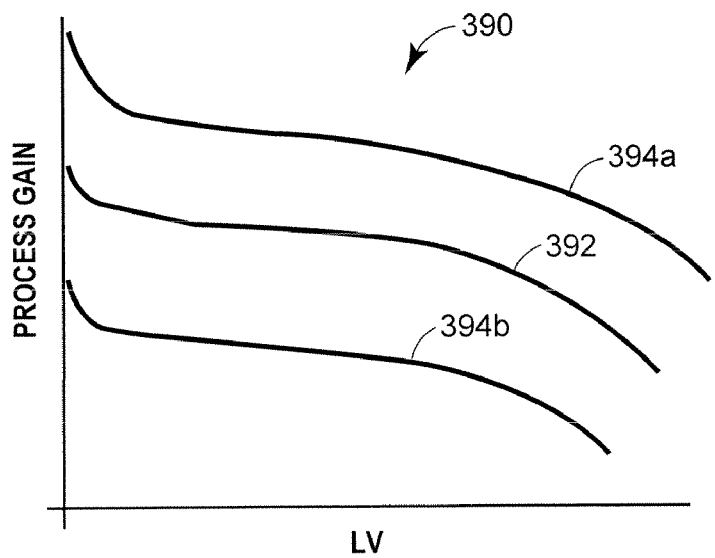
FIG. 9 is a graph of an expected process gain for a control loop.

Expected values of the process gain vs. different values of a PV or an LV may be generated based on the generated signature for a control loop. Further, confidence intervals or some other type of interval may be generated for the process gain. Any of a variety of suitable techniques may be used to generate expect values and intervals for a process gain of a control loop. FIG. 9 is an example graph 390 of expected values of a process gain of a control loop versus an LV of a control loop. In particular, a line 392 indicates the expected values of the process gain, and the lines 394a and 394b may indicate an interval such as a confidence interval.

Referring again to FIGS. 7 and 8, in some implementations it may be preferable to collect PV, LV, process gain, etc., data during normal operation of the control loop (i.e., without directly causing the OP, SP, PV, LV, etc., to vary beyond that due to normal control loop operation). Thus, it may be preferable in some implementations to omit the OP generator 354 and the control signal generator 384. Or, the OP generator 354 and the control signal generator 384 each may merely comprise a normally operating PID algorithm implemented by a controller.

Figure 10:
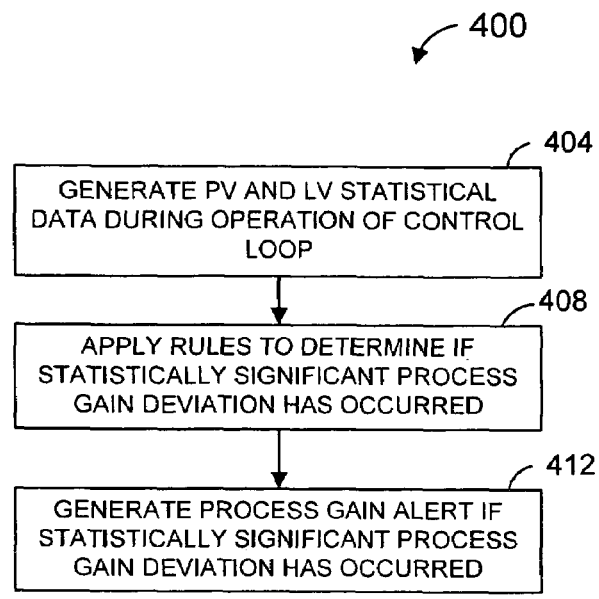
FIG. 10 is a flow diagram of an example method for detecting or predicting an abnormal situation based on process gain data.

FIG. 10 is a flow diagram of an example method 400 that may be implemented during operation of a control loop to help detect, predict, mitigate, and/or prevent an abnormal situation. At a block 404, PV and LV statistical data may be generated during operation of the control loop. For example, SPM blocks may be used to generate mean, standard deviation, etc., data for the PV and LV. The statistical data (e.g., mean, standard deviation) may be generated over some small number of samples of the PV or the LV, such as 8-12 samples. Smaller or larger sample sizes (including significantly larger sample sizes) could also be used. Also, a process gain may be generated based on the measured PV and LV data, PV and LV statistical data (e.g., means), etc. The SPM blocks could be implemented, for example, by one or more of field devices, a controller, or a workstation.

At a block 408, rules may be applied to some or all of the statistical data generated at the block 404 to determine if a statistically significant process gain deviation has occurred. For example, statistical data generated at the block 404 may be compared with a control loop signature and/or confidence intervals. Rules, such as rules similar to SPC rules, may be applied. For example, it may be determined if a mean of a PV fell outside of a confidence interval. Also, it may be determined if a particular number of PV mean values fell below the signature, or if a particular number of PV mean values fell above the signature. As further examples, it may be determined if a process gain fell outside of a confidence interval, a particular number of process gain values fell below the signature, or if a particular number of process gain values fell above the signature.

At a block 412, an alert may be generated if it is determined at the block 408 that a statistically significant process gain deviation has occurred. Additionally or alternatively, some action may be taken such as making process plant adjustments, adjusting control signal values, shutting equipment down, initializing additional diagnostic procedures, etc.

Figure 11:
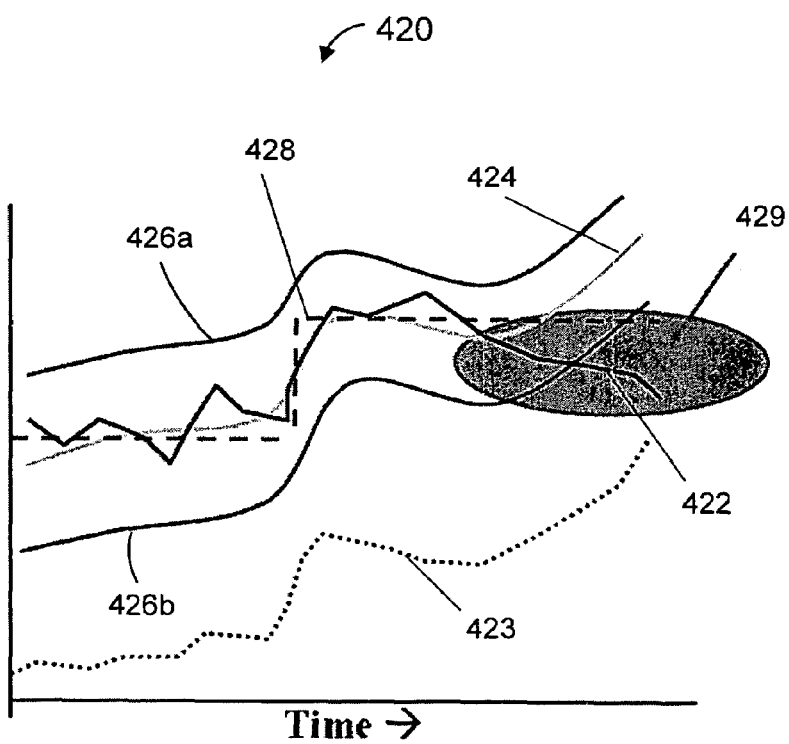
FIG. 11 is a graph illustrating various process values during an interval of operation of a control loop.

FIG. 11 is an example graph 420 illustrating various values during an interval of operation of a control loop and may help illustrate the operation of the method 400 of FIG. 10. In the graph 420, a median 422 of a PV during an interval of operation of the control loop is shown. Also, a median 423 of an LV is shown. These medians may be calculated at the block 404 of FIG. 10, for example. Further, the graph shows an expected value 424 of the PV and the confidence interval 426a, 426b during the interval of operation. As can be seen in the graph 420, the expect value 424 of the PV varies as the median 423 of the LV varies. In a region generally indicated by the circle 429, the median 422 of the PV falls below the lower bound 426b of the confidence interval and continuously falls below the expected value 424 for a period of time. Thus an alert may be generated (blocks 408 and 412 of FIG. 10) or some other action may be taken.

Figure 12:
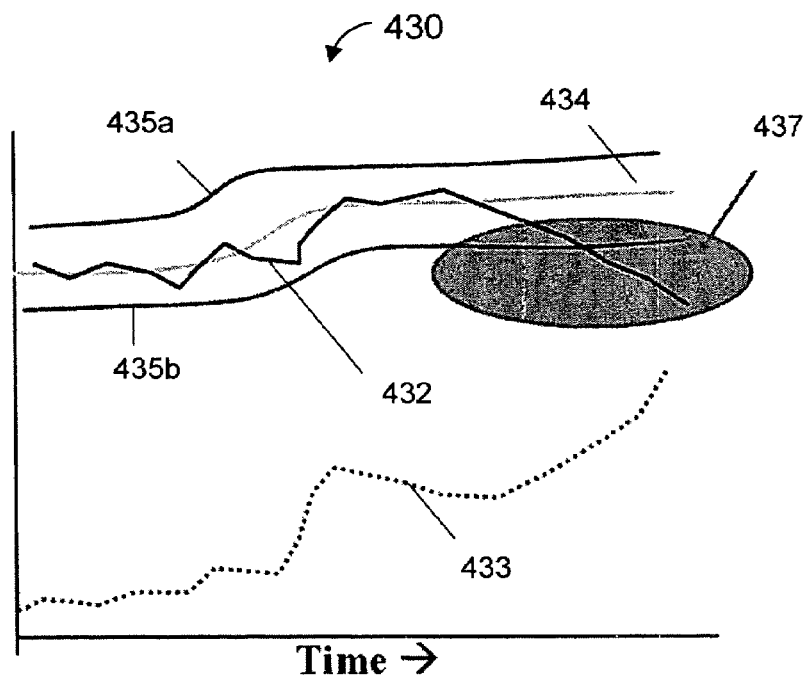
FIG. 12 is a graph illustrating process gain during an interval of operation of a control loop.

FIG. 12 is another example graph 430 illustrating various values during an interval of operation of another control loop. In the graph 430, an actual process gain 432 during an interval of operation of the control loop is shown. The actual process gain 432 may be calculated based on collected PV and LV values for example. Also shown is a median 433 of an LV. The process gain and the median may be calculated at the block 404 of FIG. 10, for example. Further, the graph shows the expected value 434 of the process gain and the confidence intervals 435a, 435b over time. As can be seen in the graph 430, the expected process gain 434 may vary as the median 433 of the LV varies. An oval 437 generally indicates a region in which the actual process gain 433 continuously falls below the expected process gain 434 for a period of time and also falls below the lower bound 435b of the confidence interval. Thus an alert may be generated or some other action may be taken.

Figure 13:
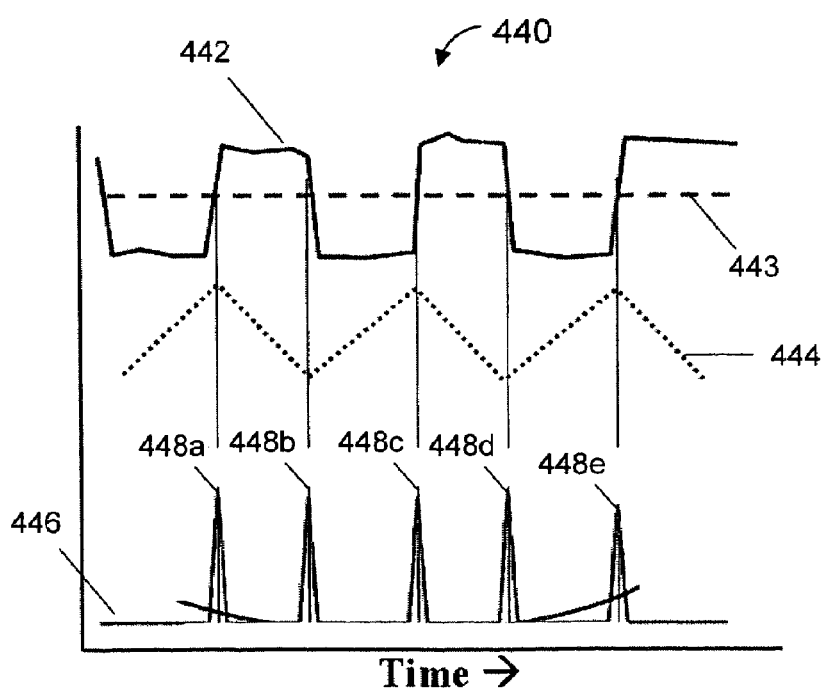
FIG. 13 is a graph illustrating process variables and process gain during an interval of operation of a control loop.

FIG. 13 is another example graph 440 showing a stick-slip condition associated with a control loop. In this example, a process gain may be determined based on a change in a PV as a result of a given change in an OP. The graph 440 includes a PV 442, a SP 443, an OP 444, and an actual process gain 446. As can be seen in the graph 440, the stick-slip condition causes spikes 448 in the actual process gain 446. Applied rules may result in the spikes causing an alert to be generated or some other action to be taken.

It is believed that the detection of statistically significant process gain related deviations, such as those described above, may provide an early indicator of process problems. Early knowledge about a process gain change may be able to provide time for the operator to analyze the problem before it becomes critical. Additionally, detection of statistically significant process gain related deviations may help with root cause analysis and/or provide an inference tool to base recommended operator responses. For example, if a unit feed valve is open more than expected, this may indicate that an extra pressure drop exists in the system caused by, for example, an obstruction either upstream or downstream of the valve. An alert to an operator could be generated indicating that a unit feed flow valve is too far open: "FIC-xxx valve appears too far open. Check pump xxx strainer". A help screen associated with the alert could be provided that would lead the operator to a historical trend of the PV vs. OP showing actual, expected loop signature and confidence intervals with statistical alarm points shown (e.g., in a different color).

Figure 14:
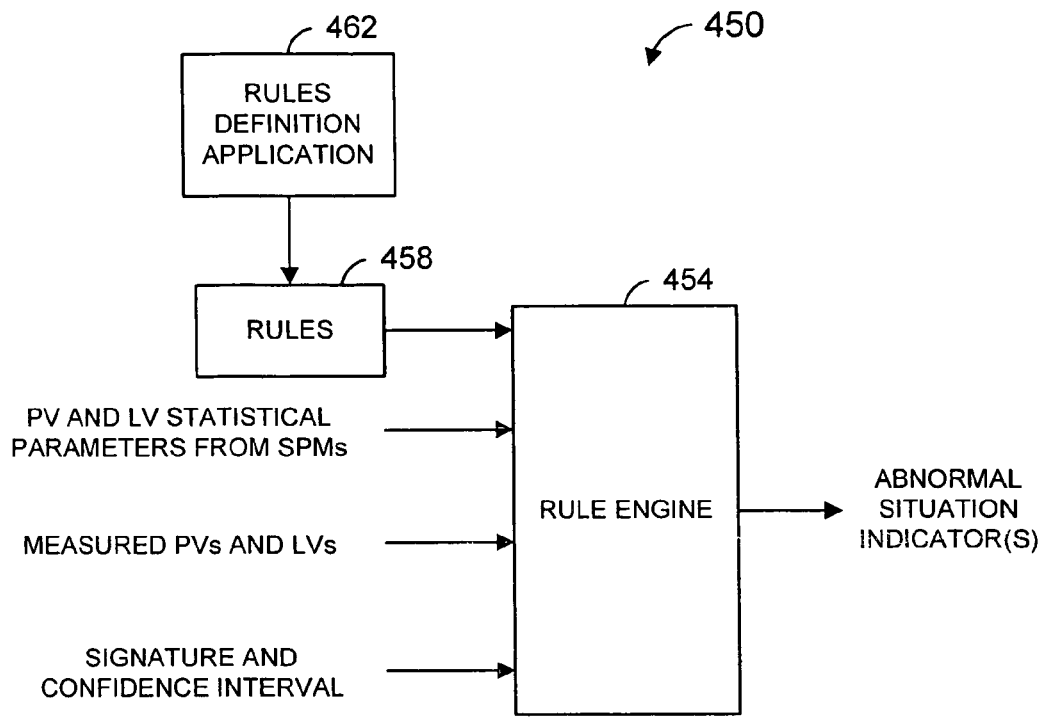
FIG. 14 is a block diagram of an example subsystem that may be used to detect and/or predict an abnormal situation based on process gain data.

Referring again to FIG. 10, the method 400 may be implemented via a rules-based expert engine, for example. FIG. 14 is a block diagram of an example rules system 450 that may be used to implement the method 400.

The rules system 450 may include a rules engine 454, which may be any type of rules based expert engine and a set of rules 458 which may be stored in a database (such as within one or more memories associated with one or more field devices, a controller, a workstation 14, etc.) accessible by the rules engine 454. The rules engine 454 analyzes statistical parameters associated with process variables (e.g., PV, LV, etc.), which may be generated, for example, by one or more SPM blocks.

The rules engine 454 may also analyze other data such as measured or generated process variables (e.g., PV, LV, etc.). The rules engine 454 may also analyze signature and confidence interval data such as the signature and confidence interval data generated at the blocks 312 and 316 of FIG. 5.

The rules engine 454 applies the rules 458 to the statistical parameters, the signature and confidence interval data, and, optionally, other data to determine if an abnormal situation exists that indicates, according to at least one of the rules 458, that an alert or alarm should sent to a user, for example. Of course, if desired, the rules engine 454 may take other actions, in addition to or instead of providing or setting an alarm, if a rule indicates that a problem exists. Such actions may include, for example, shutting down one or more components of the process, switching or adjusting control parameters to alter the control of the process, initializing additional diagnostic procedures, etc.

Optionally, a rules development application or routine 462 may enable a user to develop one or more expert system rules (e.g., to be used as one of the rules 458) based on statistical data patterns and their correlations, to thereby detect abnormal situations associated with the control loop. Thus, while at least some of the rules 458 used by the rules engine 454 may be preset or preconfigured, the rules development application 462 enables a user to create other rules based on experiences within the process plant being monitored. For example, if a user knows that a certain combination of process gain conditions or events indicates a certain problem with the control loop, the user can use the rules development application 462 to create an appropriate rule to detect this condition and/or, if desired, to generate an alarm or alert or to take some other action based on the detected existence of this condition. U.S. Provisional Patent Application No. 60/549,796, filed Mar. 3, 2004, and entitled "ABNORMAL SITUATION PREVENTION IN A PROCESS PLANT" and U.S. patent application Ser. No. 10/971,361, filed Oct. 22, 2004, and entitled "ABNORMAL SITUATION PREVENTION IN A PROCESS PLANT," describe example rules development applications and configuration screens that may be used to create rules for detecting abnormal situations and/or, if desired, for generating alarms, alerts, or for taking some other action based on the detected existence of abnormal situations. Similar or different rules development applications may be used as well to develop the rules 458. The above-referenced patent applications are hereby incorporated by reference herein in their entireties for all purposes.

Of course, during operation of the process plant, the rules engine 454, which may be configured to receive the SPM data, for example, (and any other needed data), applies the rules 458 to determine if any of the rules are matched. If an abnormal situation associated with the process gain of the control loop is detected based on one or more of the rules 458, an alert can be displayed to a plant operator, or sent to another appropriate person, or some other action may be taken.

The rules engine 454 may be implemented, at least partially, by one or more field devices associated with a control loop. Additionally or alternatively, the rules engine 454 may be implemented, at least partially, by some other device such as one or more other a controller, a workstation, etc.

Additionally, some of the data that may be used by the rules engine 454 may be generated by SPM blocks in field device. In this case, the rules engine 454 may be a client system or may be part of a client system that reads the SPM parameters and conditions from the field device via, for example, one or more of a communications link, a controller, etc.

Figure 15:
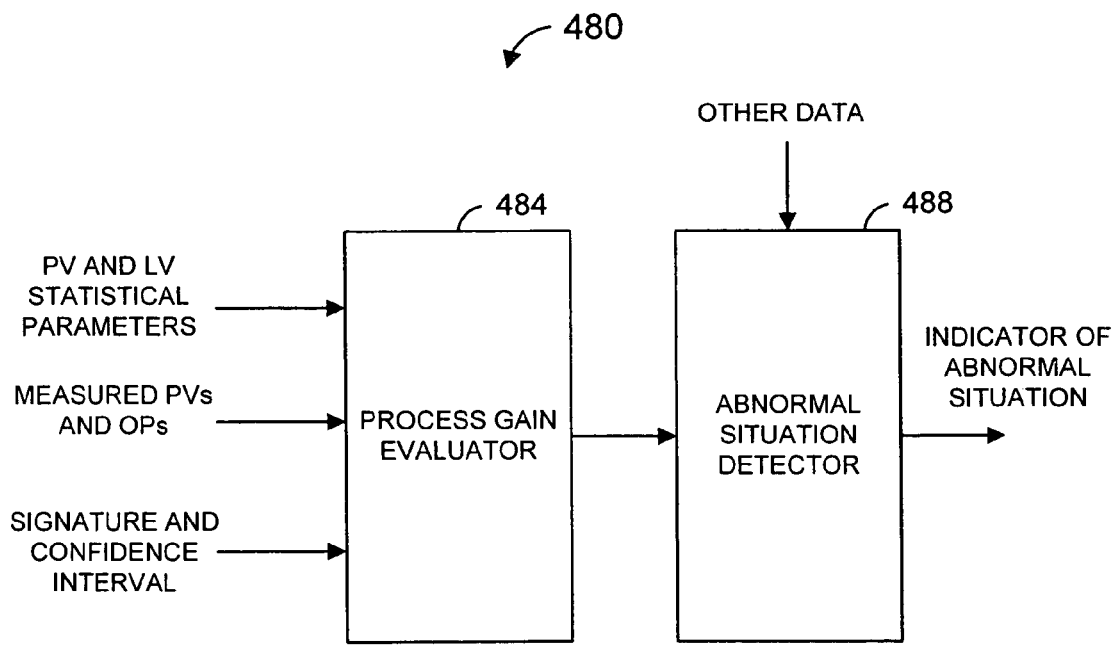
FIG. 15 is a block diagram of an example subsystem that may be used to detect substantial deviations in process gain.

Referring again to FIG. 10, the method 400 may need not be implemented via a rules-based expert engine. FIG. 15 is a block diagram of another example system 480 that may be used to implement the method 400. A process gain evaluator 484 may receive process gain data such as measured or processed PV's, and/or LV's, measured or processed process gains, etc. For example, the process gain evaluator could receive measured PV values, mean PV values, and/or median PV values. Additionally, the process gain evaluator 484 could receive process gain signature data and, optionally, interval data. The process gain evaluator 484 could be configured to generate an indicator when a PV, LV, or calculated process gain substantially deviates from an expected behavior. For example, the process gain evaluator 484 could be configured to determine an expected value of a PV based on an LV corresponding to a process gain and based on the received process gain signature data. Additionally, the process gain evaluator 484 could be configured to keep track of time periods in which an actual PV value or a processed PV value (e.g., a mean, median, etc. of the PV) continuously stayed above the expected values or continuously stayed below the expected values. Also, the process gain evaluator 484 could be configured to determine if an actual PV value or a processed PV value fell outside of an interval indicated by the received interval data. Additionally, the process gain evaluator 480 could be configured to keep track of time periods in which an actual PV value or a processed PV value continuously fell outside of an interval indicated by the received interval data. Further, the process gain evaluator 484 could be configured to generate process gains based on received measured or processed PV's and/or LV's. Then, the process gain evaluator 484 could determine if the process gain substantially deviated from a process gain signature. The system 480 could also comprise an abnormal situation detector 488. The abnormal situation detector 488 could receive one or more indicators when the PV, LV, or calculated process gain substantially deviates from the expected behavior. The abnormal situation detector 488 could optionally receive other types of data such as actual values of process variables, statistical values of process variables, alerts, historical data, etc. Additionally, the abnormal situation detector 488 could receive outputs from other process gain evaluators such as process gain evaluators associated with different control loops. The abnormal situation detector 488 could be configured to detect one or more abnormal situations associated with a control loop and/or process plant entity associated with the control loop (e.g., a unit operation such as a heater, a compressor, a column, a drum, etc.) based at least on the indicator when the PV, LV, or calculated process gain substantially deviates from the expected behavior. The abnormal situation detector 488 could comprise an expert system, for example, or any other suitable system for detecting an abnormal situation in a process plant.

Substantial deviation may generally indicate a statistically significant deviation. For example, a substantial deviation may occur if a PV, OP, a gain, falls below an expected value for a specified period of time (e.g., a specified time period, a specified number of samples, etc.). As another example, a substantial deviation may occur if a PV or OP falls above an expected value for a specified period of time. As yet another example, a substantial deviation may occur if a PV or OP falls outside of an interval about an expected value (e.g., a confidence interval).

Figure 16:
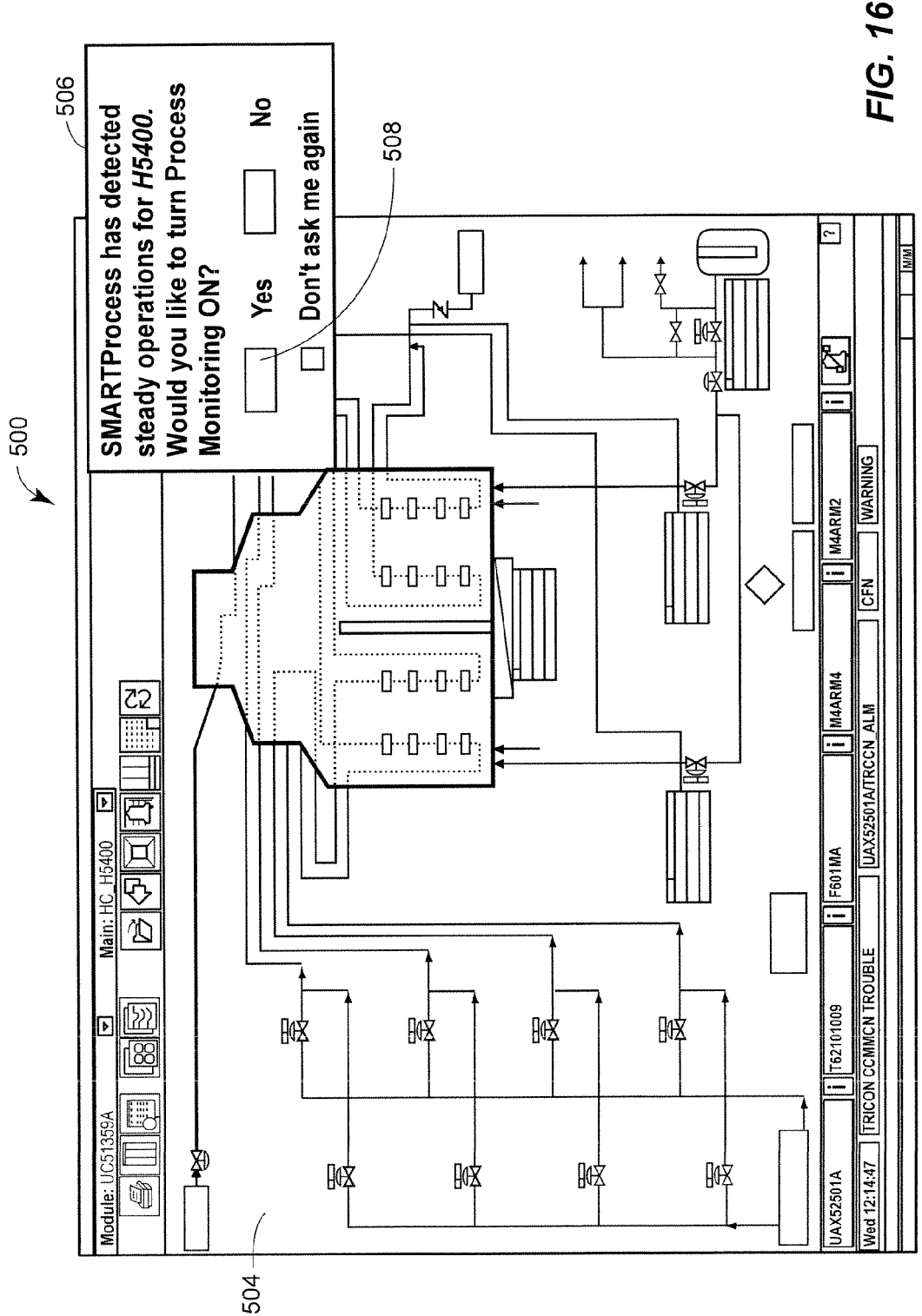
FIG. 16 is an example screen display associated with process gain analysis for a heater.

In some implementations, a system may be provided to permit a user to easily apply the above techniques to a plurality of control loops in a process plant or a portion of the process plant. For example, the system may permit auto or semiauto-configuration of SPM blocks associated with a PID-based control loop using configuration information from a PIBD block itself. As another example, the system may permit a user to jointly operate a group of process gain analysis subsystems associated with an item of equipment or a process unit. FIG. 16 is an example screen display 500 associated with a heater. The display 500 includes a graphical depiction 504 of a heater in a process plant. In this example, a steady state operation of the heater has been detected. In response, an operator may be prompted whether to turn on a process gain analysis via a window 506. If the operator selects, via a button 508, to turn on process gain analysis, process gain analysis for one or more control loops associated with the heater unit may commence. As another example, an operator may be prompted and/or may be able to easily turn learning mode ON or OFF for all or particular process gain analysis subsystems associated with a specific piece of equipment or process unit (e.g., a heater unit).

In some implementations, a system may provide standard criteria (e.g., expert system rules) that may be used to identify similar problems for multiple control loops associated with similar process control systems. For example, if a process plant includes multiple heater units, a common set of criteria associated with monitoring process gains could be provided for each similar control loop in the heater units. But signatures and/or confidence intervals for each control loop in the heater units could be determined individually. Optionally, a user could modify or customize the common set of criteria as applied to some subset of the heater units.

Also, the system may allow an authorized user to define specific messages, guidance and rule-based, "if-then-else" logic behind any loop's process gain alerts.

Figure 17:
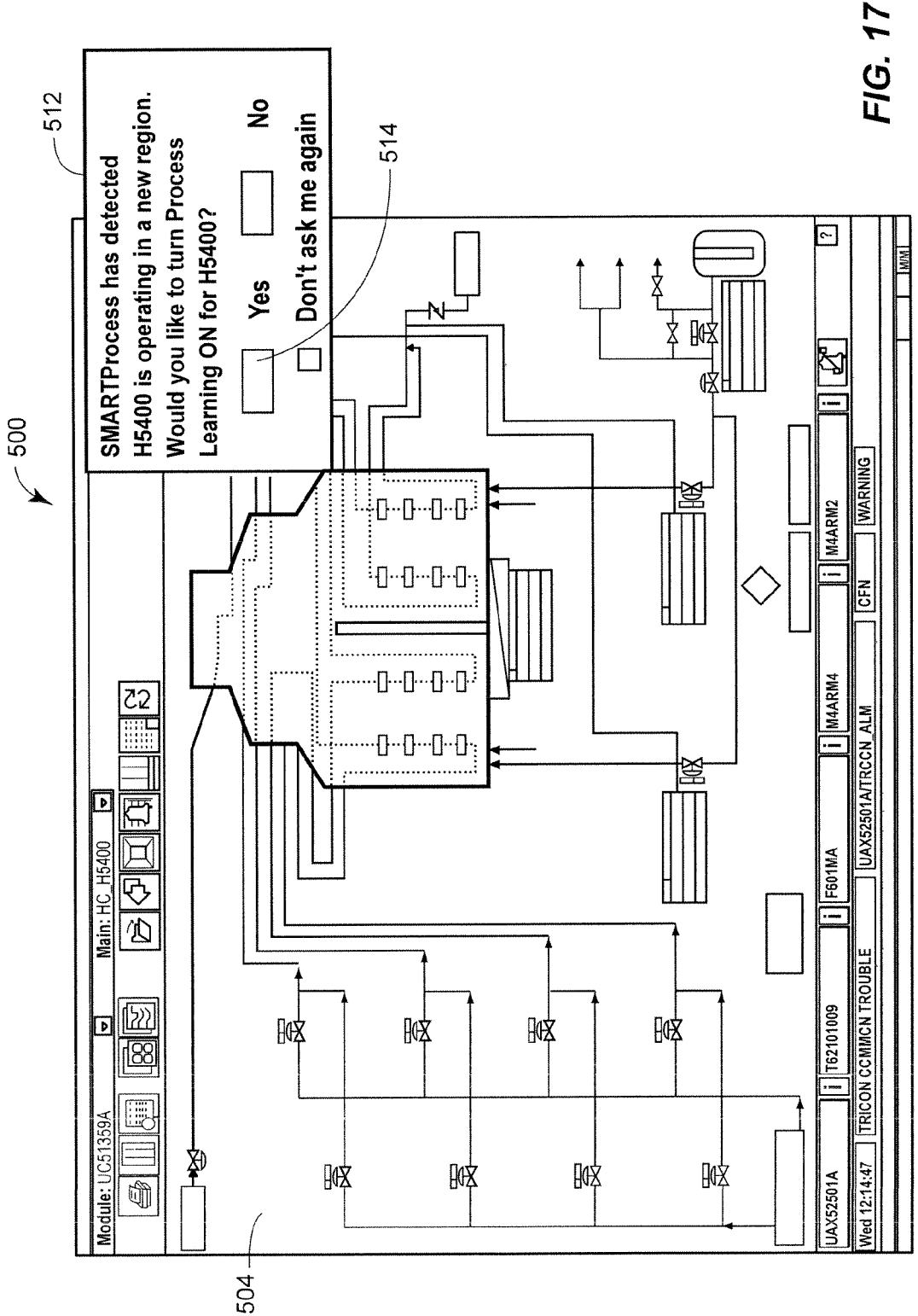
FIG. 17 is another example screen display associated with process gain analysis for a heater.

Referring again to FIG. 5, a control loop signature may be determined over some region or regions of operation of the control loop. During operation of the control loop, it may be determined that the control loop is operating in a region for which a signature has not yet been determined. Under this condition, the system may generate expected values for this new region of operation based on the signature previously generated for the other regions of operation. Additionally or alternatively, an operator may be prompted as to whether a new Learn mode should be initiated to obtain data including data for the new region of operation. Additionally, the operator may be prompted as to whether Learn mode should be "turned off" when sufficient data has been collected for a particular operating region. FIG. 17 is the example screen display 500 of FIG. 16 when a new region of operation of the heater has been detected. An operator may be prompted via a window 512 whether to turn on a Learn mode when the new region of operation is detected. If the operator selects, via a button 514, to turn on the Learn mode, determination of process gain related signatures and, optionally, intervals for one or more control loops associated with the heater unit may commence. For example, collection of process gain related data may begin. Optionally, a user could turn on Learn mode without being prompted. For example, at some later time, a user could turn on the Learn mode in order to add to Learn mode data previously obtained and/or to replace some or all of the previously obtained Learn mode data. In effect, this would modify the process gain signature. As another example, the user could recognize a new region of operation and turn the Learn mode on to obtain process gain data for that region. The user could turn Learn mode on for a particular control loop and/or all control loops associated with a process plant unit (e.g., all control loops associated with a distillation column).

Figure 18:
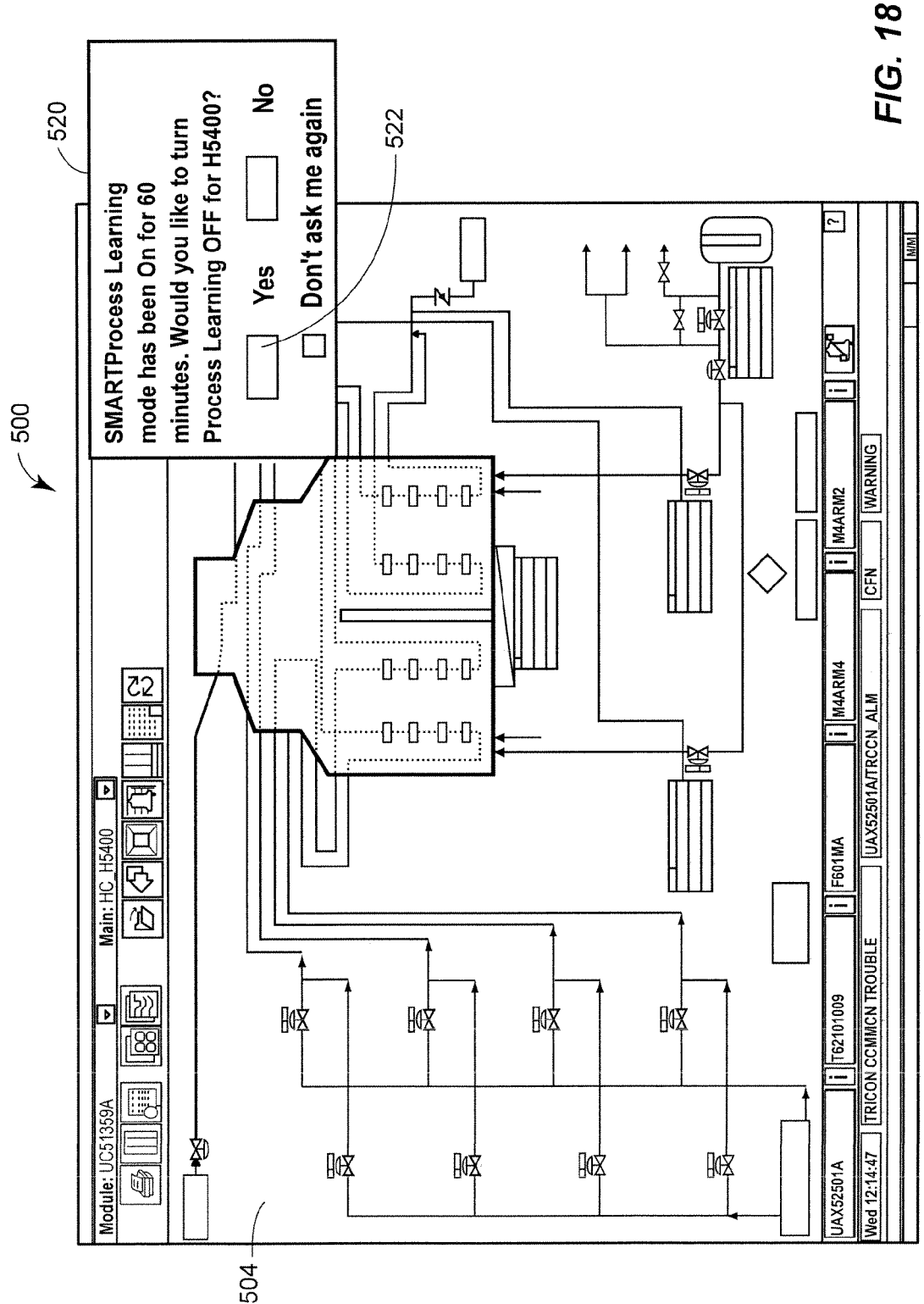
FIG. 18 is yet another example screen display associated with process gain analysis for a heater.

FIG. 18 is the example screen display 500 of FIG. 16 after the Learn mode has been operating for a selected period of time (e.g., 60 minutes). At that time, the operator may be prompted, via the window 520, whether to turn off the Learn mode. If the operator selects, via a button 522, to turn off the Learn mode, collection of process gain related data for determining signatures and/or intervals may stop. Further, the signatures and/or intervals could be determined based on the data collected up to that point, for example.

The above discussed methods and systems can be used with a variety of control loops, equipment, units, etc., in process plants associated with various industries. As just one example, the above methods and techniques may be used with a feed heater with a control loop for adjusting furnace fuel. In this example, the temperature setpoint and the normal operating region for the temperature process variable may be relatively constant and independent of charge rates. The steady-state value for the temperature controller output (e.g., fuel flow) may be more related to unit charge rate than the temperature process variable. In this case, the process gain could be determined as being the heater charge (LV) in relation to the temperature controller output (OP). As just one example, a short-term process gain deviation might be of interest and may cause a process gain alert to be generated.

Figure 19:
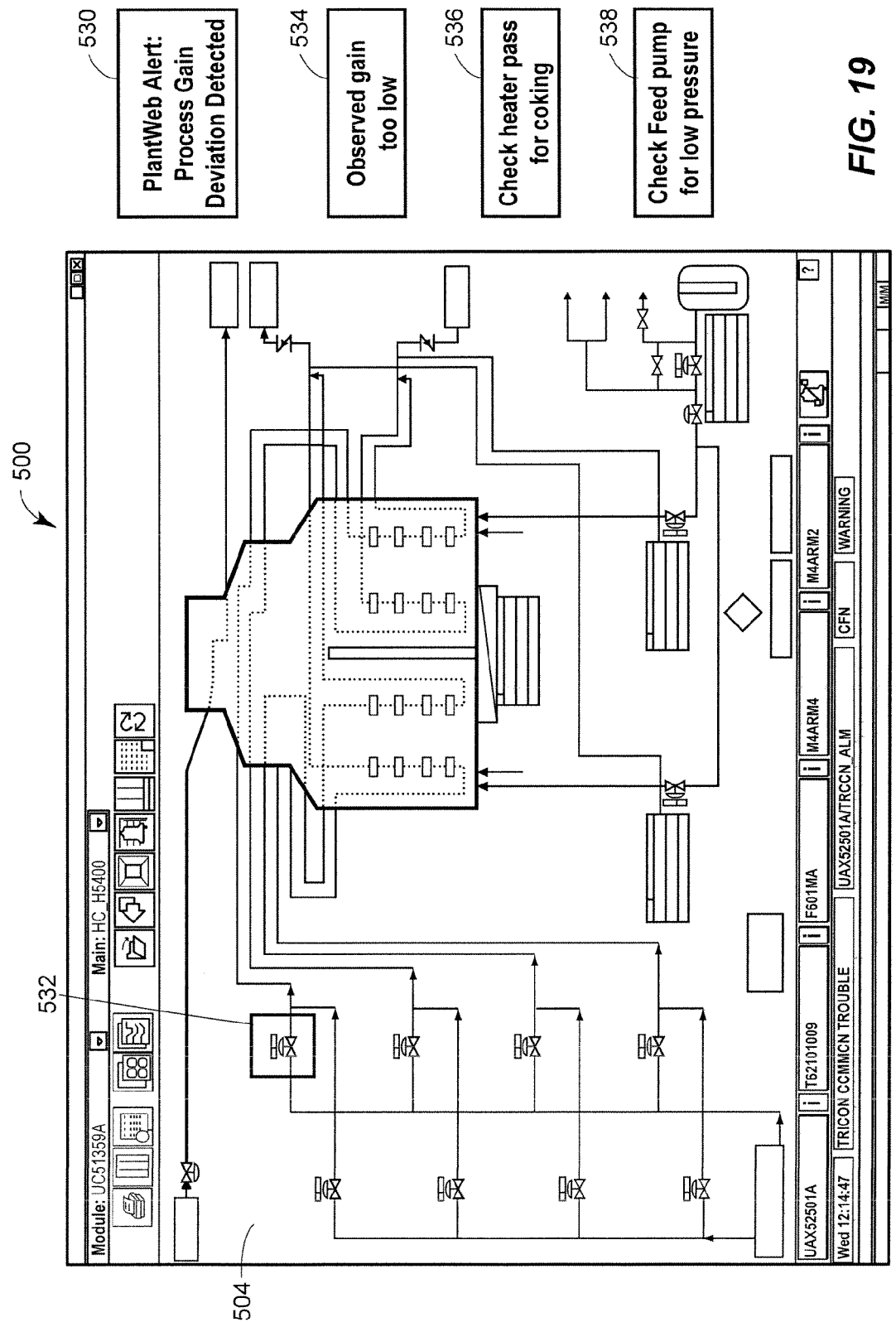
FIG. 19 illustrates still another example screen display associated with process gain analysis for a heater.

FIG. 19 illustrates the example screen display 500 during a process gain analysis system for the heater. If a process gain deviation associated with the heater is detected, an alert could be generated. For instance, a window 530 could be displayed informing the operator that a process gain deviation had been detected. Further, a control loop, a piece of equipment, etc., corresponding to the process gain deviation could be highlighted within the portion 504 of the display 500. For example, a box 532 could be displayed around a piece of equipment in the portion 504. As another example, color of the equipment could be changed, a portion of the display could be highlighted, etc.

Additionally or alternatively, more detailed information could be presented in the alert or in conjunction with the alert. For example, if a monitored process gain for a control loop associated with the heater falls below a confidence interval, an alert could be generated that indicates that the process gain for the loop is too low. A window 534 could be displayed that indicates the process gain appears to be too low. Additionally, the alert may provide a link, a help screen, help window, etc., that provides suggested actions. For example, a window 536 may display a suggestion to "Check heater pass for coking" and/or a window 538 may display a suggestion to "Check feed pump for low pressure." Although the windows 530, 534, 536, and 538 are illustrated as separate windows, two or more of these windows may be combined.

Similar alerts could be generated and/or window could be displayed when a process gain associated with the heater falls above a confidence interval, continuously falls below expected values for a selected period of time, falls above expected values for a selected period of time, etc. Process gain analysis may be used with a variety of control loops associated with a heater such as those involving pass flows, temperatures, fuel, total heater charge, airflow, O2, etc.

Figure 20:
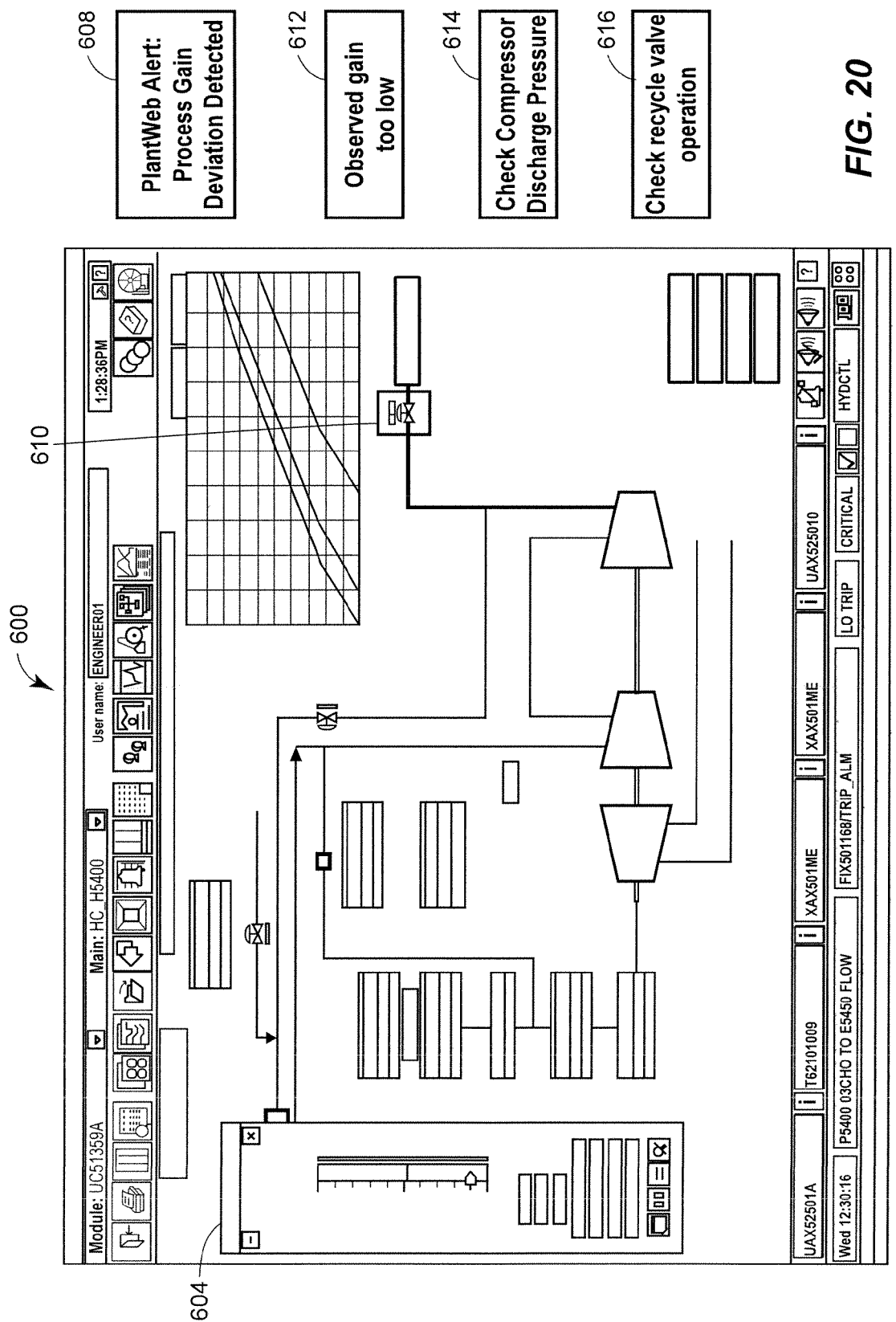
FIG. 20 illustrates an example screen display associated with process gain analysis for a compressor.

As another example, process gain analysis may be provided for a compressor. FIG. 20 illustrates an example screen display 600 that may be used in a process gain analysis system for a compressor. The display 600 includes a portion 604 that graphically depicts the compressor. If a process gain deviation associated with the compressor is detected, an alert could be generated. For instance, a window 608 could be displayed informing the operator that a process gain deviation had been detected. Further, a control loop, a piece of equipment, etc., corresponding to the process gain deviation could be highlighted within the portion 604 of the display 600. For example, a box 610 could be displayed around a piece of equipment in the portion 504. As another example, color of the equipment could be changed, a portion of the display could be highlighted, etc.

Additionally or alternatively, more detailed information could be presented in the alert or in conjunction with the alert. For example, if a monitored process gain for a control loop associated with the compressor goes above a confidence interval, an alert could be generated that indicates that the process gain for the loop is too high. A window 612 could be displayed that indicates the process gain appears to be too high. Additionally, the alert may provide a link, a help screen, help window, etc., that provides suggested actions. For example, a window 614 may display a suggestion to "Check compressor discharge pressure" and/or a window 616 may display a suggestion to "Check recycle valve operation." Although the windows 608, 612, 614, and 616 are illustrated as separate windows, two or more of these windows may be combined.

Similar alerts could be generated and/or window could be displayed when a process gain associated with the compressor falls above a confidence interval, continuously falls below expected values for a selected period of time, falls above expected values for a selected period of time, etc. For example, if it is determined that a process gain associated with the compressor falls below a confidence level, additional information could be provided by or in conjunction with the alert such as suggestions to "Check discharge pressure sensor," "Check recycle valve," etc. Process gain analysis may be used with a variety of control loops associated with a compressor such as those involving inlet pressure, outlet pressure, RPM, temperatures, etc.

Figure 21:
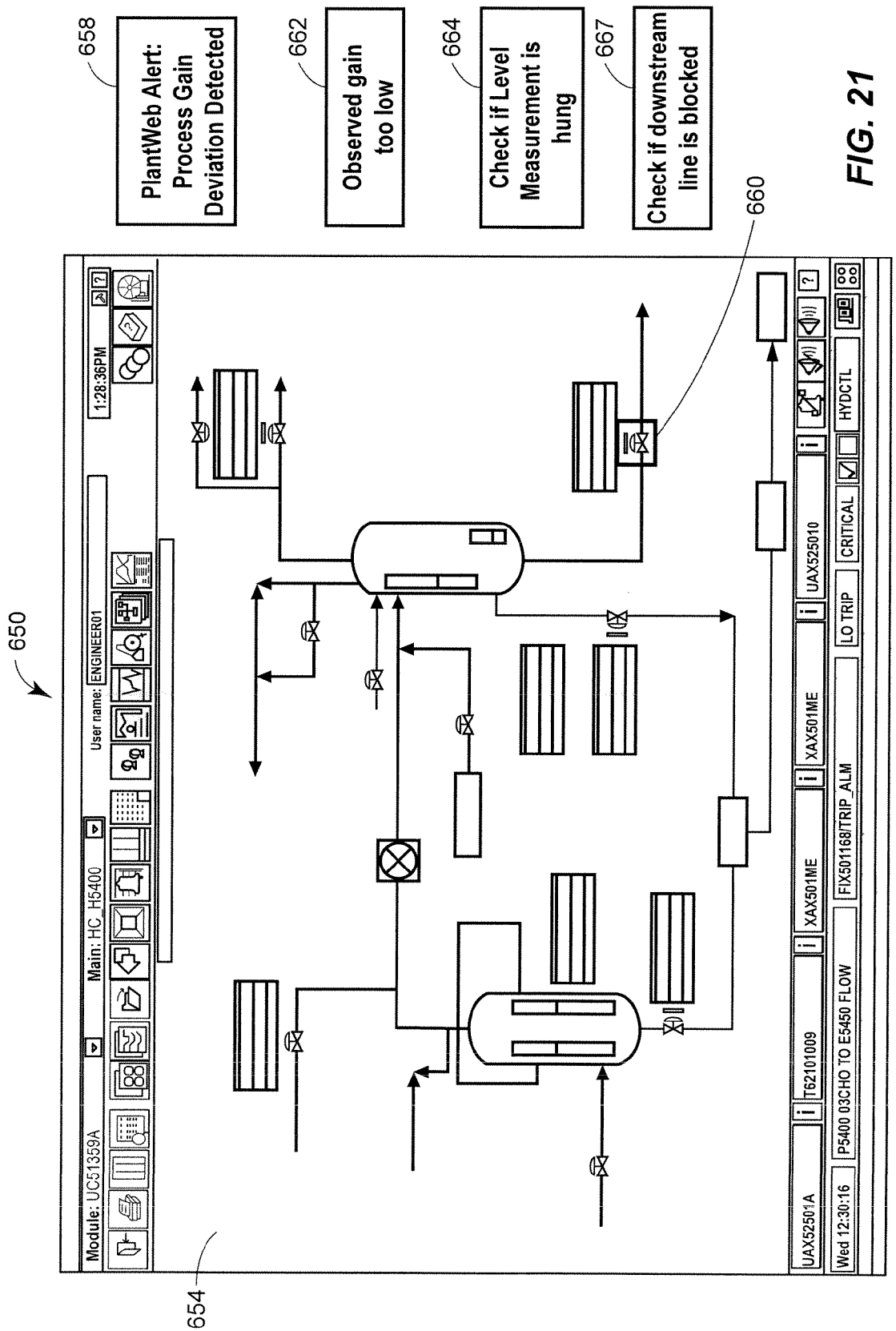
FIG. 21 illustrates an example screen display associated with process gain analysis for a drum.

As yet another example, process gain analysis may be provided for a drum. FIG. 21 illustrates an example screen display 650 that may be used in a process gain analysis system for a drum. The display 650 includes a portion 654 that graphically depicts the drum. For instance, a window 658 could be displayed informing the operator that a process gain deviation had been detected. Further, a control loop, a piece of equipment, etc., corresponding to the process gain deviation could be highlighted within the portion 654 of the display 600. For example, a box 660 could be displayed around a piece of equipment in the portion 654. As another example, color of the equipment could be changed, a portion of the display could be highlighted, etc.

Additionally or alternatively, more detailed information could be presented in the alert or in conjunction with the alert. For example, if a monitored process gain for a control loop associated with the drum falls below a confidence interval, an alert could be generated that indicates that the process gain for the loop is too low. A window 662 could be displayed that indicates an observed gain is too low. Additionally, the alert may provide a link, a help screen, help window, etc., that provides suggested actions. For example, a window 664 may display a suggestion to "Check if level measurement is hung," and/or a window 667 may display a suggestion to "Check if downstream line is blocked." Although the windows 658, 662, 664, and 667 are illustrated as separate windows, two or more of these windows may be combined.

Figure 22:
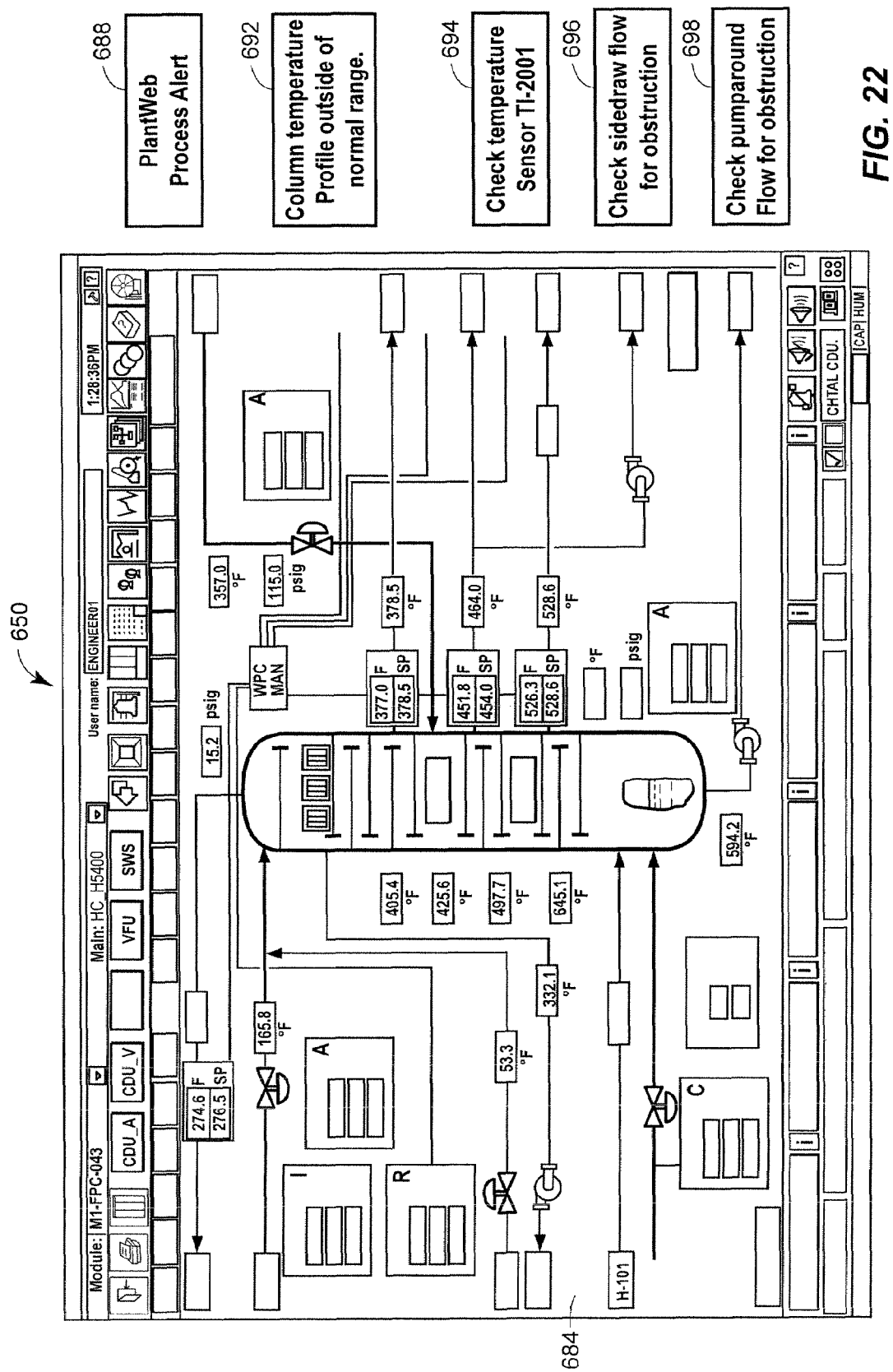
FIG. 22 illustrates an example screen display associated with process gain analysis for a distillation column.

As still another example, process gain analysis may be provided for a distillation column. FIG. 22 illustrates an example screen display 680 that may be used in a process gain analysis system for a column. The display 680 includes a portion 684 that graphically depicts the column. For instance, a window 688 could be displayed informing the operator of an alert associated with the column. Further, a control loop, a piece of equipment, measured or estimated values, etc., corresponding to the alert could be highlighted within the portion 684 of the display 680. For example, an oval 690 could be displayed around a group of measurements or estimated values in the portion 684. As another example, color of the values could be changed, a color of a background to the values could be changed, a portion of the display could be highlighted, etc.

Additionally or alternatively, more detailed information could be presented in the alert or in conjunction with the alert. For example, if a temperature associated with the column falls outside of a confidence interval, an alert could be generated that indicates that the temperature is outside of a normal range. A window 692 could be displayed that indicates a temperature profile is outside of a normal range. Additionally, the alert may provide a link, a help screen, help window, etc., that provides suggested actions. For example, a window 694 may display a suggestion to "Check temperature sensor TI-2001," a window 696 may display a suggestion to "Check sidedraw flow for obstruction," and/or a window 698 may display a suggestion to "Check pumparound flow for obstruction." Although the windows 688, 692, 694, 696, and 698 are illustrated as separate windows, two or more of these windows may be combined.

Referring now to FIGS. 19-22, it may be useful to provide additional information to the user. For example, a context-sensitive trend chart could be displayed to the user. The trend chart could include data such as one or more of process variables associated with process gain, expected values of process variables, statistical values associated with process variables, confidence intervals, indications of statistically significant deviations of process gain, etc.

Example messages to be displayed to a user were described with reference to FIGS. 16-22. It will be understood by those of ordinary skill in the art that these messages are merely examples and that different messages may be used in different implementations. In general, the messages displayed to a user may be designed to prompt a user whether to begin obtaining process gain signature data, to prompt the user whether to stop obtaining process gain signature data, to prompt the user whether to begin monitoring process gain data, to inform the user that a potential problem may exist, and/or to inform the user what potential problems may exist.

Process gain analysis may be used with a variety of control loops associated with a column such as those involving pressures, temperatures, etc.

As further examples, the above described systems and methods may be can be used with reactors and pumps. Process gain analysis may be used with a variety of control loops associated with a reactors and pumps such as those involving flows, pressures, temperatures, etc.

A "learned signature" can also be applied to measurements around specific process unit operations, such as pumps, heaters, compressors, distillation columns, reactors, etc. For instance, the temperature points in a distillation column will typically move up and down together in relation to each other. In other words, their observed process gains should match over time. When one point moves out of synch with the others, the comparison of the expected gain may indicate a temperature deviation problem long before a High temperature alarm might be generated. In one implementation, a signature and an interval (e.g., a confidence interval) corresponding to a relationship between a process variable and one or more other process variables may be determined. For example, a signature and confidence interval corresponding to a relationship among a first temperature point and at least a second temperature point in a distillation column could be determined. Then, an alert could be generated if it is determined that the first temperature point substantially deviates from the signature.

Figure 23:
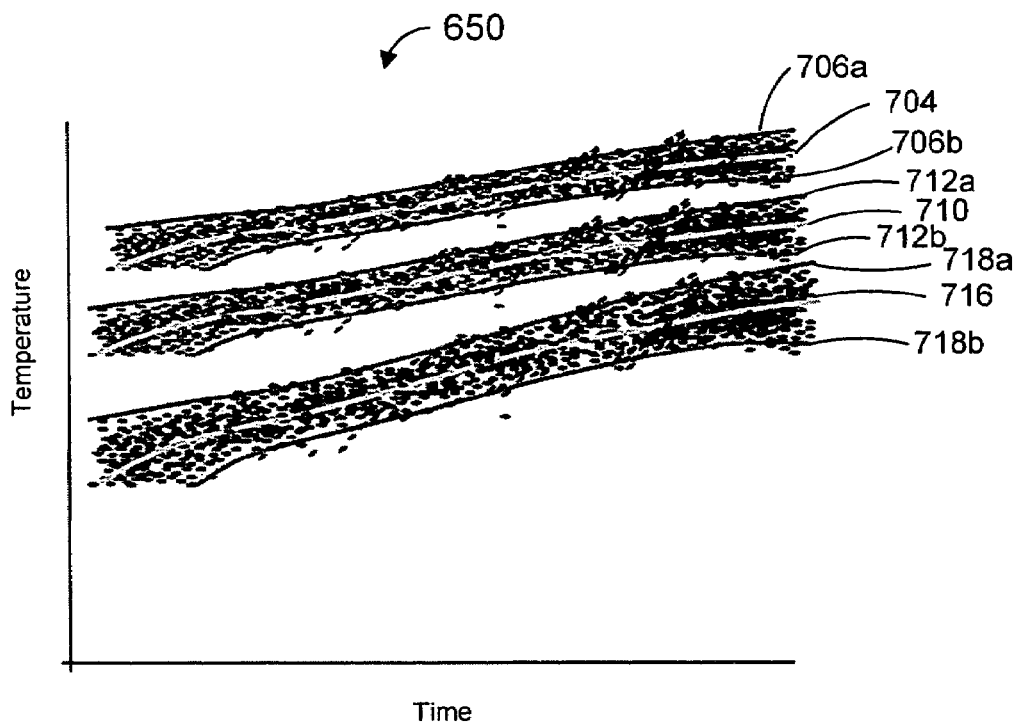
FIG. 23 illustrates signatures and confidence intervals for a plurality of pass outlet temperatures for a heater.
Figure 24:
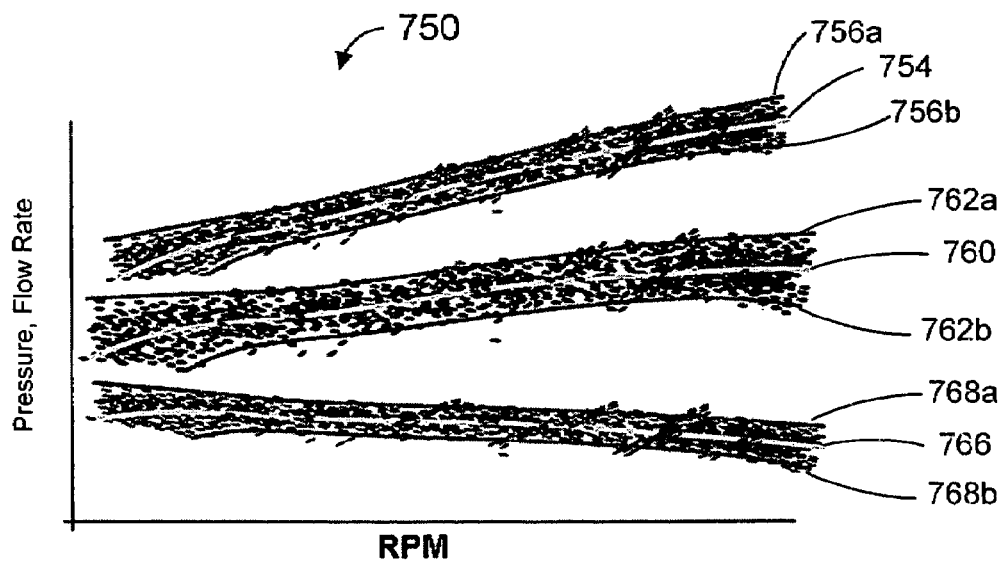
FIG. 24 illustrates signatures and confidence intervals for a plurality of process variables associated with a compressor.

FIG. 23 is an example graph 700 illustrating signatures and confidence intervals for a plurality of pass outlet temperatures for a heater. The graph 700 includes an expected first temperature 704 and an associated confidence interval 706, an expected second temperature 710 and an associated confidence interval 712, and an expected third temperature 716 and an associated confidence interval 718. The signature for each temperature may be based on a relationship of one or more of the other temperatures. Similarly, FIG. 24 is an example graph 750 illustrating signatures and confidence intervals for a plurality of process variables associated with a compressor. The graph 750 includes an expected discharge pressure 754 and an associated confidence interval 756, an expected inlet flow 760 and an associated confidence interval 762, and an expected inlet pressure 766 and an associated confidence interval 768. The signature for each of the discharge pressure, the inlet flow, and the inlet pressure may be based on a relationship of one or more of the other of the discharge pressure, the inlet flow, and the inlet pressure, as well as rotations per minute (RPM) associated with the compressor.

Figure 25:
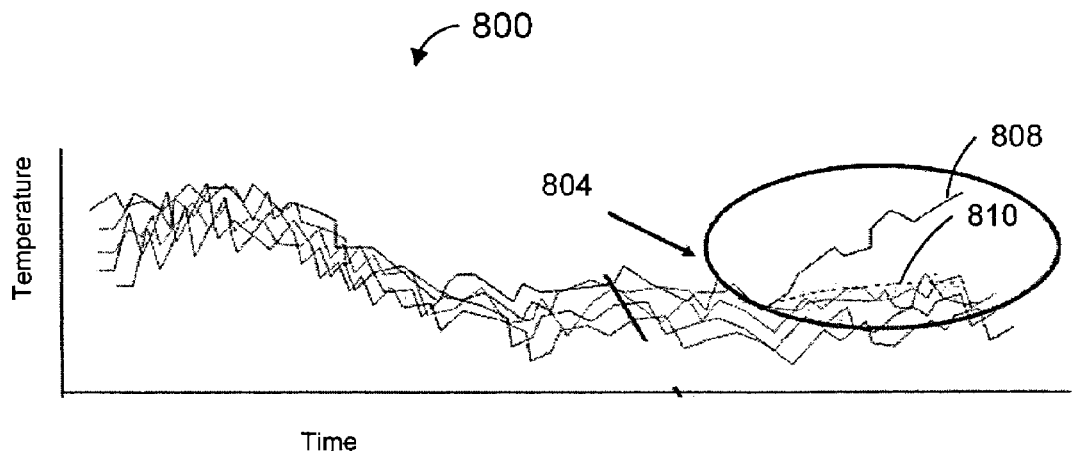
FIG. 25 illustrates graphs of various process variables during an interval of operation of a heater.

FIG. 25 is an example graph 800 of a plurality of pass outlet temperatures associated with a heater. In a time period generally indicated by the oval 804, one of the pass outlet temperatures 808 substantially deviates from expected values 810. This substantial deviation could cause an alert to be generated or some other action to be taken or initiated. The expected value 810 could be based on a relationship of the pass outlet temperature 808 to one or more of the other pass outlet temperatures, an OP associated with the heater, etc.

Figure 26:
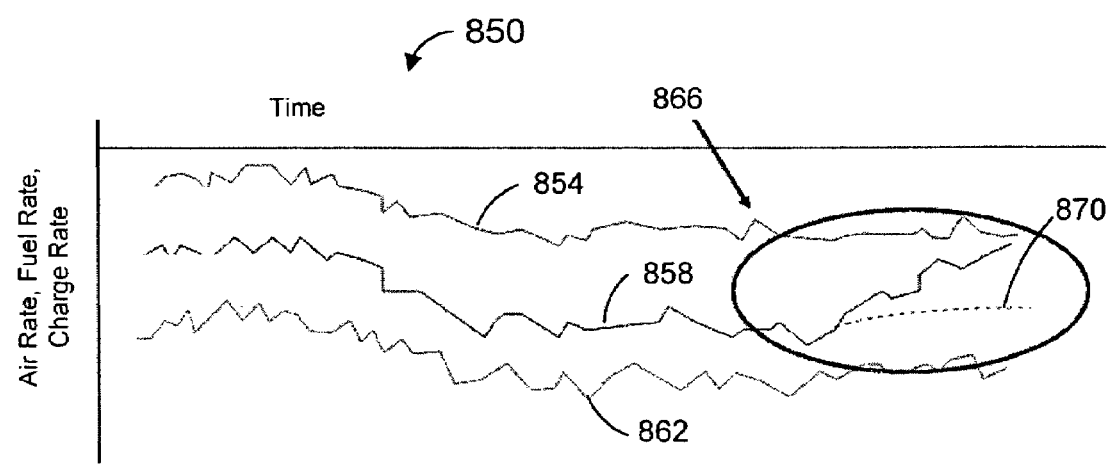
FIG. 26 illustrates graphs of various process variables during an interval of operation of a heater.

FIG. 26 is an example graph 850 of a plurality of process variables associated with a heater. In particular, the graph 850 includes an air rate 854, a fuel rate 858, and a charge rate 862. In a time period generally indicated by the oval 866, the fuel rate 858 substantially deviates from expected values 870. This substantial deviation could cause an alert to be generated or some other action to be taken or initiated. The expected value 870 could be based on a relationship of the fuel rate to one or more of the air rate 854, the charge rate 862, an OP associated with the heater, etc. For example, if the fuel rate increases without a corresponding increase in the charge rate, this may indicate an abnormal situation with the heater.

Some or all of the blocks of FIGS. 7, 8, 14, and 15 may be implemented in whole or in part using software, firmware, or hardware. Similarly, the example methods described with respect to FIGS. 5 and 10 may be implemented in whole or in part using software, firmware, or hardware. If implemented, at least in part, using a software program, the program may be configured for execution by a processor and may be embodied in software instructions stored on a tangible medium such as CD-ROM, a floppy disk, a hard drive, a digital versatile disk (DVD), or a memory associated with the processor, but persons of ordinary skill in the art will readily appreciate that the entire program or parts thereof could alternatively be executed by a device other than a processor, and/or embodied in firmware and/or dedicated hardware in a well known manner. Likewise, the software program may be delivered to a user, a process plant or an operator workstation using any known or desired delivery method including, for example, on a computer readable disk or other transportable computer storage mechanism or over a communication channel such as a telephone line, a satellite link, a radio-frequency link, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

Referring to FIGS. 1 and 2, one or all of the blocks of FIGS. 7, 8, 14, and 15 may be implemented by one or more a controller such as the controller 12B, the controller 14B, and the controller 60, an I/O device such as the I/O card 12C, the I/O device 68, the I/O device 70, a field device such as a field device 15, a field device 16, a field device 64, a field device 66, an operator interface device such as the operator interface 12A, the operator interface 14A, the user interface 72, the user interface 74, other computers in the process plant such as the maintenance computer 22, the computer 26, the computer system 30, a data collection and/or processing block such as the block 80, the block 82, etc.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure.

The invention claimed is:

1. A method for monitoring operation of a control loop in a process plant, comprising:

collecting, at one or more of a plurality of computing devices, process gain data associated with a first operating region of a control loop in a process plant, the control loop associated with a unit operation in the process plant, wherein a load variable varies in the first operating region;

determining, at one of the plurality of computing devices, an expected process gain behavior in the first operating region based on the collected process gain data, wherein an expected value of the process gain varies as the load variable varies;

wherein determining the expected process gain behavior in the first operating region comprises fitting a curve to the collected process gain data, and wherein the curve corresponds to the expected process gain behavior in the first operating region;

monitoring, at one of the plurality of computing devices, the process gain during operation of the control loop in the first operating region;

determining, at one of the plurality of computing devices, when the monitored process gain substantially deviates from the curve corresponding to the expected process gain behavior in the first operating region;

determining, at one of the plurality of computing devices, an abnormal situation associated with at least one of the control loop or the unit operation based at least on a substantial deviation from the curve corresponding to the expected process gain behavior in the first operating region; and generating, at one of the plurality of computing devices, an abnormal situation indicator when an abnormal situation is determined.

2. A method according to claim 1, wherein collecting process gain data associated with the first operating region of the control loop comprises at least one of:

collecting data regarding a process variable versus the load variable;

collecting data regarding the load variable versus the process variable;

collecting data regarding a process gain versus the load variable;

collecting data regarding the load variable versus a process gain; or collecting data regarding the process variable versus one or more other process variables.

3. A method according to claim 2, wherein the load variable comprises at least one of a control output or another process variable.

4. A method according to claim 1, wherein determining the expected process gain behavior in the first operating region comprises at least one of:

determining expected values of a variable; or determining expected rates of change of the variable.

5. A method according to claim 1, wherein determining the abnormal situation comprises determining an abnormal situation associated with the unit operation based at least on a substantial deviation from the curve corresponding to the expected process gain behavior in the first operating region of the control loop and a substantial deviation from an expected process gain behavior of a different control loop associated with the unit operation.

6. A method according to claim 1, further comprising:

collecting, at one of the plurality of computing devices, process gain data associated with at least a second operating region of the control loop in the process plant;

determining, at one of the plurality of computing devices, an expected process gain behavior in the at least the second operating region based on the collected process gain data;

wherein determining the expected process gain behavior in the at least the second operating region comprises fitting another curve to the collected process gain data associated with the at least a second operating region, and wherein the other curve corresponds to the expected process gain behavior in the at least the second operating region;

monitoring, at one of the plurality of computing devices, the process gain during operation of the control loop in the at least the second operating region;

determining, at one of the plurality of computing devices, when the monitored process gain substantially deviates from the curve corresponding to the expected process gain behavior in the at least the second operating region; and wherein determining the abnormal situation comprises determining the abnormal situation based at least on a substantial deviation from the curve corresponding to the expected process gain behavior in the first operating region or a substantial deviation from the curve corresponding to the expected process gain behavior in the second operating region.

7. A method according to claim 1, wherein collecting process gain data associated with the first operating region of the control loop comprises collecting process gain data regarding a plurality of process gains associated with the control loop, the plurality of process gains including at least a first process gain and a second process gain;

wherein determining the expected process gain behavior in the first operating region comprises determining an expected behavior of the first process gain with respect to at least the second process gain;

wherein the curve corresponding to the expected process gain behavior in the first operating region corresponds to the expected behavior of the first process gain with respect to at least the second process gain;

wherein monitoring the process gain during operation of the control loop in the first operating region comprises monitoring the first process gain and monitoring the second process gain;

wherein determining when the monitored process gain substantially deviates from the curve corresponding to the expected process gain behavior in the first operating region comprises determining when the monitored first process gain substantially deviates from the expected behavior of the first process gain with respect to at least the second process gain.

8. A method according to claim 1, wherein determining when the monitored process gain substantially deviates from the curve corresponding to the expected process gain behavior in the first operating region comprises at least one of:

determining when the monitored process gain is below the curve corresponding to the expected process gain behavior in the first operating region for a specified period of time; or determining when the monitored process gain is above the curve corresponding to the expected process gain behavior in the first operating region for the specified period of time.

9. A method according to claim 1, wherein determining the expected process gain behavior in the first operating region comprises determining a confidence interval for the first operating region;

wherein determining when the monitored process gain substantially deviates from the expected process gain behavior in the first operating region comprises determining at least when the monitored process gain is outside of the confidence interval in the first operating region.

10. A method according to claim 9, wherein determining when the monitored process gain substantially deviates from the expected process gain behavior in the first operating region comprises determining when the monitored process gain is outside of the confidence interval in the first operating region for a specified period of time.

11. A method according to claim 1, if an abnormal situation is determined, further comprising at least one of:

adjusting, at one of the plurality of computing devices, a control parameter associated with the control loop;

initiating, at one of the plurality of computing devices, a diagnostic procedure; or shutting down, via one or more computing devices, equipment associated with the control loop.

12. A method according to claim 1, wherein generating an abnormal situation indicator comprises generating an alert.

13. A method according to claim 1, wherein determining the abnormal situation comprises determining at least one of:

if the abnormal situation has occurred, or if the abnormal situation will likely occur in the future.

14. A method according to claim 1, further comprising:

determining, at one of the plurality of computing devices, when the control loop is operating in a second operating region for which process gain data has not yet been collected; and collecting, at one of the plurality of computing devices, process gain data associated with the second operating region of the control loop in the process plant after determining that the control loop is operating in the second operating region of the control loop;

monitoring, at one of the plurality of computing devices, the process gain during operation of the control loop in the second operating region; and determining, at one of the plurality of computing devices, when the monitored process gain substantially deviates from the expected process gain behavior in the second operating region.

15. A method according to claim 14, further comprising;
prompting, at one of the plurality of computing devices, an operator whether to collect process gain data associated with the second operating region of the control loop in the process plant after determining that the control loop is operating the second operating region of the control loop;
wherein collecting process gain data associated with the second operating region of the control loop comprises process gain data associated with the second operating region if the operator indicates that process gain data associated with the second operating region of the control loop should be collected.

16. A method according to claim 14, wherein a unit of the process plant comprises the control loop;
wherein determining when the control loop is operating in the second operating region comprises determining when the unit of the process plant is operating in an operating region for which process gain data associated with the unit has not yet been collected.

17. A tangible medium having stored thereon machine executable instructions, the machine executable instructions capable of causing one or more machines to:
collect process gain data associated with a first operating region of a control loop in a process plant, wherein a load variable varies in the first operating region;
determine an expected process gain behavior in the first operating region based on the collected process gain data, wherein an expected value of the process gain varies as the load variable varies;
wherein determining the expected process gain behavior in the first operating region comprises fitting a curve to the collected process gain data, and wherein the curve corresponds to the expected process gain behavior in the first operating region;
monitor the process gain during operation of the control loop in the first operating region;
determine when the monitored process gain substantially deviates from the curve corresponding to the expected process gain behavior in the first operating region;
determine an abnormal situation associated with at least one of the control loop or the unit operation based at least on a substantial deviation from the curve corresponding to the expected process gain behavior in the first operating region; and
generate an abnormal situation indicator if the abnormal situation is determined.

18. A method for monitoring operation of a control loop in a process plant, comprising:
collecting process gain data associated with a first operating region of a control loop in a process plant, wherein a load variable varies in the first operating region;
determining an expected process gain behavior in the first operating region based on the collected process gain data associated with the first operating region, wherein an expected value of the process gain varies as the load variable varies;
wherein determining the expected process gain behavior in the first operating region comprises fitting a curve to the collected process gain data, and wherein the curve corresponds to the expected process gain behavior in the first operating region;
providing data indicative of the curve corresponding to the expected process gain behavior in the first operating region to an expert engine;
providing process gain data associated with the control loop during operation of the control loop to the expert engine;
utilizing the expert engine to detect an abnormal situation associated with the control loop based on the data indicative of the curve corresponding to the expected process gain behavior in the first operating region and the process gain data associated with the control loop during operation of the control loop; and
generating an abnormal situation indicator if the abnormal situation is determined.

19. A method according to claim 18, wherein utilizing the expert engine to detect the abnormal situation associated with the control loop comprises determining whether the process gain in the first operating region substantially deviates from the curve corresponding to the expected process gain behavior in the first operating region.

20. A method according to claim 18, further comprising:
providing process variable statistical data associated with the control loop during operation of the control loop to the expert engine; and
wherein utilizing the expert engine to detect the abnormal situation associated with the control loop comprises utilizing the expert engine to detect the abnormal situation associated with the control loop further based on the process variable statistical data associated with the control loop.

21. A method according to claim 20, wherein the process variable statistical data associated with the control loop comprises statistical data generated by field devices associated with the control loop.

22. A system for monitoring operation of a control loop in a process plant, the system comprising:
a process gain signature generator configured to generate a signature of expected process gain behavior associated with a control loop in a process plant, wherein the signature is indicative of a gain of a process variable of the control loop versus a load variable of the control loop, and wherein the gain of the process variable versus the load variable is expected to vary as the load variable varies;
wherein the process gain signature generator is configured to fit a curve to collected process gain data, and wherein the signature of expected process gain behavior comprises the curve;
a process gain evaluator configured to determine if an actual process gain substantially deviates from the curve; and
an abnormal situation detector configured to detect an abnormal situation associated with a process unit associated with the control loop based at least in part on whether the actual process gain substantially deviates from the curve and to generate an abnormal situation indicator if the abnormal situation is detected.

23. A system according to claim 22, further comprising:
an interval generator configured to generate an interval associated with the signature of expected process gain behavior;
wherein the process gain evaluator is configured to determine if the actual process gain substantially deviates from the curve based on the interval associated with the signature of expected process gain behavior.

24. A system according to claim 22, further comprising an expert system, wherein the expert system comprises at least one of the process gain evaluator or the abnormal situation detector.

25. A system according to claim 24, wherein the expert system is configured to detect an abnormal situation associated with a process unit associated with the control loop based at least in part on whether the actual process gain substantially deviates from the curve.

26. A system according to claim 22, further comprising a process gain data collector configured to collect data to be used by the process gain signature generator to generate the signature of expected process gain behavior associated with the control loop.

27. A system according to claim 22, wherein the abnormal situation detector is configured to detect at least one of:
 if the abnormal situation has occurred, or
 if the abnormal situation will likely occur in the future.

28. A method for facilitating monitoring operation of at least a portion of a process plant, comprising:
 collecting, at one of a plurality of computing devices, process gain data indicative of respective process gains associated with respective unit operations in a process plant, wherein the respective process gains are associated with an operating region, wherein respective load variables vary in the operating region;
 determining, at one of the plurality of computing devices, expected process gains associated with respective unit operations based on the collected process gain data, wherein expected values of the respective process gains vary as the respective load variables vary;
 wherein determining the expected process gains associated with respective unit operations comprises fitting respective curves to the collected process gain data, and wherein the respective curves correspond to respective unit operations;
 providing, at one of the plurality of computing devices, a common set of criteria for determining for each unit operation an abnormal situation associated with the unit operation based at least on whether the process gain associated with the unit operation substantially deviates from the curve associated with the unit operation;
 permitting, at one of the plurality of computing devices, a user to modify the common set of criteria for a particular unit operation to generate a modified set of criteria;
 utilizing, at one of the plurality of computing devices, the modified set of criteria to determine for the particular unit operation an abnormal situation associated with the particular unit operation;
 utilizing, at one of the plurality of computing devices, the common set of criteria to determine for each of at least one other unit operation an abnormal situation associated with the other unit operation; and
 generating, at one of the plurality of computing devices, an abnormal situation indicator when an abnormal situation for a unit operation is determined.

29. A method according to claim 28, wherein the common set of criteria comprises expert rules to be applied by an expert engine.

30. A method for monitoring operation of a control loop in a process plant, comprising:
 collecting, at one of the plurality of computing devices, process gain data associated with an operating region of a control loop in a process plant, the control loop associated with a unit operation in the process plant, wherein the process gain data is indicative of a gain of a process variable of the control loop versus a load variable of the control loop, and wherein the gain of the process variable versus the load variable varies as the load variable varies;
 determining, at one of the plurality of computing devices, an expected process gain behavior in the operating region based on the collected process gain data, wherein the process gain is expected to vary as the load variable varies;
 wherein determining the expected process gain behavior in the operating region comprises fitting a curve to the collected process gain data, and wherein the curve corresponds to the expected process gain behavior in the operating region;
 monitoring, at one of the plurality of computing devices, the process gain during operation of the control loop in the operating region;
 determining, at one of the plurality of computing devices, when the monitored process gain substantially deviates from the curve;
 determining, at one of the plurality of computing devices, an abnormal situation associated with at least one of the control loop or the unit operation based at least on a substantial deviation from the curve; and
 generating, at one of the plurality of computing devices, an abnormal situation indicator when an abnormal situation is determined.

31. A method for facilitating monitoring operation of at least a portion of a process plant, comprising:
 collecting, at one of a plurality of computing devices, process gain data indicative of process gains associated with respective unit operations in a process plant, wherein each of the process gains is a gain of a process variable of the respective unit versus a load variable of the respective unit, and wherein each of the process gains varies as the respective load variable varies;
 determining, at one of the plurality of computing devices, expected process gains associated with respective unit operations based on the collected process gain data, wherein each of the expected process gains varies as the respective load variable varies; and
 wherein determining the expected process gains associated with respective unit operations comprises fitting respective curves to the collected process gain data, and wherein the respective curves correspond to respective unit operations;
 providing, at one of the plurality of computing devices, a common set of criteria for determining for each unit operation an abnormal situation associated with the unit operation based at least on whether the process gain associated with the unit operation substantially deviates from the curve associated with the unit operation.

* * * * *